(12) United States Patent
Li et al.

(10) Patent No.: US 11,330,284 B2
(45) Date of Patent: May 10, 2022

(54) DERIVING MOTION INFORMATION FOR SUB-BLOCKS IN VIDEO CODING

(71) Applicant: QUALCOMM Incorporated, San Diego, CA (US)

(72) Inventors: Xiang Li, San Diego, CA (US); Ying Chen, San Diego, CA (US); Li Zhang, San Diego, CA (US); Hongbin Liu, Beijing (CN); Jianle Chen, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 486 days.

(21) Appl. No.: 15/080,480

(22) Filed: Mar. 24, 2016

(65) Prior Publication Data

US 2016/0286232 A1    Sep. 29, 2016

Related U.S. Application Data

(60) Provisional application No. 62/182,367, filed on Jun. 19, 2015, provisional application No. 62/139,572, filed on Mar. 27, 2015.

(51) Int. Cl.
*H04N 19/52* (2014.01)
*H04N 19/513* (2014.01)
(Continued)

(52) U.S. Cl.
CPC ......... *H04N 19/513* (2014.11); *H04N 19/109* (2014.11); *H04N 19/119* (2014.11);
(Continued)

(58) Field of Classification Search
CPC .. H04N 19/109; H04N 19/119; H04N 19/139; H04N 19/176; H04N 19/44;
(Continued)

(56) References Cited

U.S. PATENT DOCUMENTS

| 8,705,622 B2 | 4/2014 | Ye et al. |
| 9,077,971 B2 | 7/2015 | Ye et al. |

(Continued)

FOREIGN PATENT DOCUMENTS

| CN | 102017637 A | 4/2011 |
| CN | 102131091 A | 7/2011 |

(Continued)

OTHER PUBLICATIONS

Zhao et al. "CE3 related: Simplifications to sub-Pu level Interview motion predictions", Document: JCT3V-F0127 JointCollaborative Team on 3D Video Coding Extensions of ITU-T SG 16 WP 3 and ISO/IEC JTC 1/SC 29/WG 11 6th Meeting: Geneva, CH, Oct. 25-Nov. 1, 2013 (Year: 2013).*

(Continued)

*Primary Examiner* — William C Vaughn, Jr.
*Assistant Examiner* — Naod W Belai
(74) *Attorney, Agent, or Firm* — Shumaker & Sieffert, P.A.

(57) ABSTRACT

In an example, a method of processing video data includes splitting a current block of video data into a plurality of sub-blocks for deriving motion information of the current block, where the motion information indicates motion of the current block relative to reference video data. The method also includes deriving, separately for each respective sub-block of the plurality of sub-blocks, motion information comprising performing a motion search for a first set of reference data that corresponds to a second set of reference data outside of each respective sub-block. The method also includes decoding the plurality of sub-blocks based on the derived motion information and without decoding syntax elements representative of the motion information.

28 Claims, 14 Drawing Sheets

(51) Int. Cl.

| | | |
|---|---|---|
| H04N 19/70 | (2014.01) | |
| H04N 19/56 | (2014.01) | |
| H04N 19/46 | (2014.01) | |
| H04N 19/96 | (2014.01) | |
| H04N 19/109 | (2014.01) | |
| H04N 19/57 | (2014.01) | |
| H04N 19/119 | (2014.01) | |
| H04N 19/139 | (2014.01) | |
| H04N 19/176 | (2014.01) | |
| H04N 19/44 | (2014.01) | |

(52) U.S. Cl.
CPC ......... *H04N 19/139* (2014.11); *H04N 19/176* (2014.11); *H04N 19/44* (2014.11); *H04N 19/46* (2014.11); *H04N 19/52* (2014.11); *H04N 19/56* (2014.11); *H04N 19/57* (2014.11); *H04N 19/70* (2014.11); *H04N 19/96* (2014.11)

(58) Field of Classification Search
CPC ...... H04N 19/46; H04N 19/513; H04N 19/52; H04N 19/56; H04N 19/57; H04N 19/70; H04N 19/96
See application file for complete search history.

(56) References Cited

U.S. PATENT DOCUMENTS

| | | | |
|---|---|---|---|
| 9,185,427 | B2 | 11/2015 | Tourapis et al. |
| 9,247,266 | B2 | 1/2016 | Zhou |
| 9,332,259 | B2 | 5/2016 | Wang et al. |
| 9,967,558 | B1* | 5/2018 | Han ..................... H04N 19/176 |
| 2002/0009143 | A1 | 1/2002 | Arye |
| 2006/0280249 | A1 | 12/2006 | Poon |
| 2009/0310875 | A1 | 12/2009 | Po et al. |
| 2011/0176611 | A1* | 7/2011 | Huang ................... H04N 19/46 |
| | | | 375/240.16 |
| 2011/0188579 | A1 | 8/2011 | Lin et al. |
| 2011/0206127 | A1 | 8/2011 | Nguyen et al. |
| 2012/0027097 | A1* | 2/2012 | Lin ....................... H04N 19/513 |
| | | | 375/240.16 |
| 2012/0257678 | A1 | 10/2012 | Zhou et al. |
| 2013/0058413 | A1 | 3/2013 | Guo et al. |
| 2013/0114717 | A1 | 5/2013 | Zheng et al. |
| 2013/0156335 | A1 | 6/2013 | Lim et al. |
| 2013/0188715 | A1 | 7/2013 | Seregin et al. |
| 2013/0202038 | A1 | 8/2013 | Seregin et al. |
| 2013/0287111 | A1 | 10/2013 | Xu et al. |
| 2013/0294519 | A1* | 11/2013 | Gilmutdinov .......... H04N 7/014 |
| | | | 375/240.16 |
| 2013/0336404 | A1 | 12/2013 | Sugio et al. |
| 2013/0342644 | A1 | 12/2013 | Rusanovskyy et al. |
| 2014/0010307 | A1 | 1/2014 | Gilmutdinov et al. |
| 2014/0016701 | A1 | 1/2014 | Chen et al. |
| 2014/0098881 | A1 | 4/2014 | Chen et al. |
| 2014/0126638 | A1* | 5/2014 | Sievers ................... H04N 19/57 |
| | | | 375/240.16 |
| 2014/0161175 | A1 | 6/2014 | Zhang et al. |
| 2014/0168363 | A1 | 6/2014 | Kang et al. |
| 2014/0307776 | A1 | 10/2014 | Srinivasan et al. |
| 2014/0327819 | A1 | 11/2014 | Wu et al. |
| 2014/0362921 | A1 | 12/2014 | Puri et al. |
| 2015/0085929 | A1 | 3/2015 | Chen et al. |
| 2015/0195562 | A1 | 7/2015 | Li et al. |
| 2016/0057420 | A1 | 2/2016 | Pang et al. |
| 2016/0212421 | A1 | 7/2016 | Muthu et al. |
| 2016/0286229 | A1 | 9/2016 | Li et al. |
| 2016/0286230 | A1 | 9/2016 | Li et al. |

FOREIGN PATENT DOCUMENTS

| | | |
|---|---|---|
| CN | 102640495 A | 8/2012 |
| CN | 102970543 A | 3/2013 |
| CN | 103392340 A | 11/2013 |
| CO | 6561766 A2 | 11/2012 |
| CO | 6852030 A2 | 1/2014 |
| EP | 1578136 A2 | 9/2005 |
| EP | 1775954 A1 | 4/2007 |
| EP | 2285113 A2 | 2/2011 |
| EP | 2562754 A1 | 2/2013 |
| EP | 2621174 A2 | 7/2013 |
| EP | 2675165 A1 | 12/2013 |
| JP | 2010268259 A | 11/2010 |
| JP | 2013543318 A | 11/2013 |
| KR | 101279573 B1 | 6/2013 |
| RU | 2310231 C2 | 11/2007 |
| RU | 2523940 C2 | 7/2014 |
| TW | 201125369 A | 7/2011 |
| WO | 2008150498 A1 | 12/2008 |
| WO | 2009126924 A1 | 10/2009 |
| WO | 2009126929 A1 | 10/2009 |
| WO | 2011048904 A1 | 4/2011 |
| WO | 2011142815 A1 | 11/2011 |
| WO | 2012045225 A1 | 4/2012 |
| WO | 2012119456 A1 | 9/2012 |
| WO | 2012172113 A1 | 12/2012 |
| WO | 2013069975 A1 | 5/2013 |
| WO | 2013109382 A2 | 7/2013 |
| WO | 2014053099 A1 | 4/2014 |
| WO | 2015106126 A1 | 7/2015 |
| WO | 2015109598 A1 | 7/2015 |
| WO | 2016029144 A1 | 2/2016 |
| WO | 2018064492 A1 | 4/2018 |
| WO | 2018064550 A1 | 4/2018 |
| WO | 2018200960 A1 | 11/2018 |

OTHER PUBLICATIONS

JCT-VC, "Test Model under Consideration (draft007)", ISO/IEC JTC1/SC29/WG11 wl1280, Apr. 2010, Dresden, DE, hereinafter "JCT-VC". (Year: 2010).*

Wiegand et al., "WD1: Working Draft 1 of High-Efficiency Video Coding", JCTVC-C403, 3rd Meeting: Guangzhou, CN, Oct. 7-15, 2010, (Joint Collaborative Team on Video Coding of ISO/IEC JTC1/SC29/WG11 and ITU-T SG.16); Jan. 6, 2011, 137 pp.

Wiegand et al., "WD2: Working Draft 2 of High-Efficiency Video Coding," JCTVC-D503, 4th Meeting: Daegu, KR, Jan. 20-28, 2011, (Joint Collaborative Team On Video Coding of ISO/IEC JTC1/SC29/WG11 and ITU-T SG.16); Apr. 15, 2011, 153 pp.

Wiegand et al., "WD3: Working Draft 3 of High-Efficiency Video Coding," Document JCTVC-E603, 5th Meeting: Geneva, CH, Mar. 16-23, 2011,(Joint Collaborative Team On Video Coding of ISO/IEC JTC1/SC29/WG11 and ITU-T SG.16); May 9, 2015, 193 pp.

Bross et al., "WD4: Working Draft 4 of High-Efficiency Video Coding," 6th Meeting: Torino, IT, Jul. 14-22, 2011, (Joint Collaborative Team on Video Coding of ISO/IEC JTC1/SC29/WG11 and ITU-T SG.16);JCTVC-F803_d2, Oct. 4, 2011, 226 pp.

Bross et al., "WD5: Working Draft 5 of High-Efficiency Video Coding," 7th Meeting: Geneva, Switzerland, Nov. 21-30, 2011, (Joint Collaborative Team on Video Coding of ISO/IEC JTC1/SC29/WG11 and ITU-T SG.16);JCTVC-G1103_d2, Dec. 30, 2011, 214 pp.

Bross et al., "High efficiency video coding (HEVC) text specification draft 6," 8th Meeting: San Jose, CA, USA, Feb. 1-10, 2012, (Joint Collaborative Team on Video Coding of ISO/IEC JTC1/SC29/WG11 and ITU-T SG.16); JCTVC-H1003, Apr. 2, 2012, 259 pp.

Bross et al., "High efficiency video coding (HEVC) text specification draft 7," 9th Meeting: Geneva, CH, Apr. 27-May 7, 2012, (Joint Collaborative Team on Video Coding of ISO/IEC JTC1/SC29/WG11 and ITU-T SG.16); JCTVC-I1003_d2, Jun. 1, 2012, 290 pp.

Bross et al., "High efficiency video coding (HEVC) text specification draft 8," 10th Meeting: Stockholm, SE, Jul. 11-20, 2012, (Joint Collaborative Team on Video Coding of ISO/IEC JTC1/SC29/WG11 and ITU-T SG.16); JCTVC-J1003_d7, Jul. 28, 2012, 261 pp.

Bross et al., "High efficiency video coding (HEVC) text specification draft 9," 11th Meeting: Shanghai, CN, Oct. 10-19, 2012, (Joint

(56) References Cited

OTHER PUBLICATIONS

Collaborative Team on Video Coding of ISO/IEC JTC1/SC29/WG11 and ITU-T SG.16); JCTVC-K1003_v7, Nov. 2, 2012, 290 pp.
Bross et al., "High efficiency video coding (HEVC) text specification draft 10 (For FDIS & Last Call)," 12th Meeting: Geneva, CH, Jan. 14-23, 2013, (Joint Collaborative Team on Video Coding of ISO/IEC JTC1/SC29/WG11 and ITU-T SG.16); JCTVC-L1003_v34, Mar. 19, 2013, 310 pp.
ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.
ITU-T H.265, Series H: Audiovisual and Multimedia Systems, Infrastructure of audiovisual services—Coding of moving video, Advanced video coding for generic audiovisual services, The International Telecommunication Union. Apr. 2013, 317 pp.
ITU-T H.265, Series H: Audiovisual and Multimedia Systems, Infrastructure of audiovisual services—Coding of moving video, Advanced video coding for generic audiovisual services, The International Telecommunication Union. Oct. 2014, 540 pp.
ITU-T H.265, Series H: Audiovisual and Multimedia Systems, Infrastructure of audiovisual services—Coding of moving video, Advanced video coding for generic audiovisual services, The International Telecommunication Union. Apr. 2015, 634 pp.
Chiu, et al., "Decoder-side Motion Estimation and Wiener filter for HEVC", 2013 Visual Communications and Image Processing (VCIP), IEEE, Nov. 17, 2013, XP032543658, DOI: 10.1109/VCIP.2013.6706446 [retrieved on Jan. 8, 2014], 6 pp.
Kamp, et al., "Decoder-Side Motion Vector Derivation for Block-Based Video Coding", IEEE transactions on circuits and systems for video technology, vol. 22, No. 12, Dec. 2012, pp. 1732-1745.
Kim, et al., "New Frame Rate Up-Conversion Algorithms With Low Computational Complexity", IEEE Transactions on circuits and systems for video technology, Mar. 2014, vol. 24, No. 3, pp. 384-393.
Lee, et al., "Frame Rate Up Conversion Based on Variational Image Fusion", IEEE Transactions on image processing, Jan. 2014, vol. 23, No. 1, pp. 399-412.
Liu, et al., "Multiple Hypotheses Bayesian Frame Rate Up-Conversion by Adaptive Fusion of Motion-Compensated Interpolations", IEEE transactions on circuits and systems for video technology, Aug. 2012, vol. 22, No. 8, pp. 1188-1198.
Liu, et al., "A Block-Based Gradient Descent Search Algorithm for Block Motion Estimation in Video Coding", IEEE Transactions Circuits and Systems for Video Technology, Aug. 1996, vol. 6, No. 4, pp. 419-422.
Tham, et al., "A Novel Unrestricted Center-Biased Diamond Search Algorithm for Block Motion Estimation," IEEE Transactions on Circuits and Systems for Video Technology, Aug. 1998, vol. 8, No. 4, pp. 369-377.
Zhu, et al., "Hexagon-Based Search Pattern for Fast Block Motion Estimation", IEEE Transactions on Circuits and Systems Video Technology, May 2002, vol. 12, No. 5, pp. 349-355.
ITU-T H.223, Series H: Audiovisual and Multimedia Systems, Infrastructure of Audiovisual Services—Transmission Multiplexing and Synchronization, Multiplexing Protocol for Low Bit Rate Multimedia Communication, The International Telecommunication Union, Jul. 2001, 74 pp.
U.S. Appl. No. 15/080,478, filed by Xiang et al., filed Mar. 24, 2016.
U.S. Appl. No. 15/080,479, filed by Xiang et al., filed Mar. 24, 2016.
Response to Written Opinion from PCT Application Serial No. PCT/US2016/024334 dated Jun. 13, 2016, which was filed on Jan. 26, 2017, (30 pages).
Second Written Opinion from PCT Application Serial No. PCT/US2016/024334 dated Mar. 31, 2017 (10 pages).
Response to Written Opinion from PCT Application Serial No. PCT/US2016/024332 dated Jun. 13, 2016, which was filed on Jan. 27, 2017, (22 pages).
Second Written Opinion from PCT Application Serial No. PCT/US2016/024332 dated Mar. 31, 2017, (10 pages).
Response to Written Opinion from PCT Application Serial No. PCT/US2016/024323 dated Aug. 3, 2016, which was filed on Jan. 27, 2017, (22 pages).
Second Written Opinion from PCT Application Serial No. PCT/US2016/024323 dated Apr. 3, 2017 (15 pages).
"Test Model under Consideration for High-Efficiency Video Coding", MPEG Meeting; Apr. 19-23, 2010; Dresden; (Motion Picture Expert Group or ISO/IEC JTC1/SC29/WG11), No. N11280, Jul. 28, 2010, XP030017777, ISSN: 0000-0029, 152 pp.
Chen, et al., "Further Improvements to HMKTA-1.0", VCEG meeting, Jun. 19-26, 2015; Warsaw, (Video Coding Experts Group Of ITU-T SG.16), No. VCEG-AZ07, Jun. 19, 2015, XP030003885, 8 pp.
Chien, et al., "Extension of Advanced Temporal Motion Vector Predictor (ATMVP)," ITU-Telecommunications Standardization Sector, 52nd Meeting; Jun. 19-26, 2015, No. VCEG-AZ10, 4 pp.
Chiu, et al., "CE1: Report of Self Derivation of Motion Estimation in TMuC 0.9", MPEG meeting, Jan. 20-28, 2011; , Daegu, (Motion Picture Expert Group Or ISO/IEC JTC1/SC29/WG11),, No. m18919, Jan. 21, 2011 , XP030047488, No. JCTVC-D167; 14 pp.
Chiu, et al., "CE1 Subtest1: A joint proposal of candidate-based decoder-side motion vector derivation", MPEG Meeting; Jan. 20-28, 2011; Daegu; (Motion Picture Expert Group or ISO/IEC JTC1/SC29/WG11),, No. m19473, No. JCTVC-D448_r1; Jan. 26, 2011, XP030048040, 10 pp.
Chiu, et al., "Description of video coding technology proposal: self derivation of motion estimation and adaptive (Wiener) loop filtering", JCT-VC meeting, Apr. 15-23, 2010; Dresden, (Joint Collaborative Team On Video Coding Of ISO/IEC JTC1/SC29/WG11 and ITU-TSG.16), URL: http://wftp3.itu.int/AV-ARCH/JCTVC-SITE/, No. JCTVC-A106, Apr. 18, 2010, XP030007537, ISSN: 0000-0049, 28 pp.
International Search Report and Written Opinion from International Application No. PCT/US2016/024323, dated Aug. 3, 2016, 20 pp.
Kamp, et al., "Decoder Side Motion Vector Derivation", MPEG Meeting, Oct. 22-26, 2007, Shenzhen, (Motion Picture Expert Group Or ISO/IEC JTC1/SC29/WG11), No. M14917, Oct. 16, 2007, XP030043523, 24 pp.
Lin, et al., "TE1: Huawei Report on DMVD Improvements", JCT-VC meeting, Jul. 21-28, 2010; Geneva, (Joint Collaborativeteam On Video Coding Of ISO/IEC JTC1/SC29/WG11 and ITU-TSG.16), URL: http://wftp3.itu.int/AV-ARCH/JCTVC-SITE/, No. JCTVC-B037, Jul. 23, 2010; XP030007617, ISSN: 0000-0048; 13 pp.
Zhao, et al., "CE3 related: Simplifications to Sub-PU Level Inter-view Motion Prediction", JCT-3V meeting, Oct. 25-Nov. 1, 2013; Geneva, (The Joint Collaborative Team On 3D Video Coding Extension Development Of ISO/IEC JTC1/SC29/WG11 and ITU-T SG.16 ), URL: http://phenix.int-evry.fr/JCT2/, No. JCT3V-F0127, Oct. 18, 2013, XP030131553, 5 pp.
International Search Report and Written Opinion from International Application No. PCT/US2016/024332, dated Jun. 13, 2016, 16 pp.
International Search Report and Written Opinion from International Application No. PCT/US2016/024334, dated Jun. 13, 2016, 15 pp.
Amirpour H., et al., "Motion Estimation Based on Region Prediction for Fixed Pattern Algorithms" International Conference on Electronics, Computer and Computation (ICECCO), Nov. 7-9, 2013, Ankara, Turkey, pp. 119-122.
Choi, Byeong-Doo, et al., "Motion-Compensated Frame Interpolation Using Bilateral Motion Estimation and Adaptive Overlapped Block Motion Compensation", IEEE Transactions on Circuits and Systems for Video Technology, vol. 17, No. 4, Apr. 2007, pp. 407-416.
International Preliminary Report on Patentability from International Application No. PCT/US2016/024323, dated Jul. 7, 2017, 16 pp.
Taiwan Search Report—TW105109601—TIPO—dated Sep. 16, 2019.
Alamdari N.T., et al., "Comparison of Classification and Dimensionality Reduction Methods used in fMRI Decoding," 2013 8th Iranian Conference on Machine Vision and Image Processing (MVIP), Zanjan, 2013, pp. 175-179.

(56) References Cited

OTHER PUBLICATIONS

Nagaraj S., "Adaptive Rate Control with Quality of Service Guarantees in Wireless Broadband Networks," 2013 IEEE Globecom Workshops (GC Wkshps), Atlanta, GA, Dec. 9-13, 2013, pp. 519-524.

Peixoto E., et al., "Application of large Macroblocks in H.264/AVC to Wavelet-based Scalable Video Transcoding," 2011 19th European Signal Processing Conference, Barcelona, Jan. 2011, pp. 2171-2175.

Chiu Y-J., et al., "Description of Video Coding Technology Proposal: Self Derivation of Motion Estimation and Adaptive (Wiener) Loop Filtering," JCTVC-A106, 1st Meeting, Dresden, DE, Apr. 15, 2010-Apr. 23, 2010, (Joint Collaborative Team on Video Coding (JCT-VC) of ITU-T SG16 WP3 and ISO/IEC JTC1/SC29/WG11), 28 pages, URL: http://wftp3.itu.int/av-arch/jctvc-site/ 20100418, the whole document.

Wiegand T., "Test Model Under Consideration (draft007)", JCTVC-B205, Joint Collaborative Team on Video Coding (JCT-VC) of ITU-T SG16 WP3 and ISO/IEC JTC1/SC29/WG11 2nd Meeting: Geneva, CH, pp. 1-179 Mar. 19, 2012 sections 5.2.11.2-5.2.11.3.

Kamp S., et al., "Decoder Side Motion Vector Derivation for Inter Frame Video Coding," Image Processing, 2008, ICIP, 15th IEEE International Conference, IEEE, Piscataway, NJ, USA, Oct. 12, 2008 (Oct. 12, 2008), XP031374203, pp. 1120-1123, ISBN: 978-1-4244-1765-0.

Klomp S., et al., "Decoder-Side Block Motion Estimation for H.264 / MPEG-4 AVC Based Video Coding," 2009 IEEE International Symposium on Circuits and Systems, IEEE, 2009, pp. 1641-1644.

Kim et al., HM7: High Efficiency Video Coding (HEVC) Test Model 7 Encoder Description: "High Efficiency Video Coding (HEVC) Test Model 7 (HM 7) Encoder Description," 9. JCT-VC Meeting; 100. MPEG Meeting; Apr. 27, 2012-May 7, 2012; Geneva, CH (Joint Collaborative Team on Video Coding of ISO/IEC JTC1/SC29/WG11 and ITU-T SG.16); URL:http://wftp3.itu.int/av-arch/jctvc-site/, No. JCTVC-I1002, Jul. 9, 2012 (Jul. 9, 2012), XP030112372, the whole document.

Tang K L., et al., "Enhanced SAD Reuse Fast Motion Estimation," Visual Communications and Image Processing, SPIE, vol. 6508, Jan. 30, 2007-Feb. 1, 2007, San Jose, CA, Jan. 30, 2007 (Jan. 30, 2007), XP030081133, 9 pages.

* cited by examiner

DERIVING MOTION INFORMATION FOR SUB-BLOCKS IN VIDEO CODING

This application claims the benefit of U.S. Provisional Application No. 62/139,572 filed Mar. 27, 2015, and U.S. Provisional Application No. 62/182,367 filed Jun. 19, 2015, the entire contents of which are incorporated herein by reference.

TECHNICAL FIELD

This disclosure relates to video coding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard, and extensions of such standards. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video frame or a portion of a video frame) may be partitioned into video blocks, which for some techniques may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to a reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to achieve even more compression.

SUMMARY

Techniques of this disclosure relate to deriving motion information in video coding. For example, a video coder (a video encoder or video decoder) may generate motion information that is not included in the bitstream to code video data that is included in the bitstream. By deriving the motion information in the encoding or decoding loop, a bit savings may be achieved relative to techniques that include motion information in the bitstream such as traditional inter-prediction techniques.

In one example, a method of decoding video data includes selecting a motion information derivation mode from a plurality of motion information derivation modes for determining motion information for a current block, wherein each motion information derivation mode of the plurality comprises performing a motion search for a first set of reference data that corresponds to a second set of reference data outside of the current block, and wherein the motion information indicates motion of the current block relative to reference video data, determining the motion information for the current block using the selected motion information derivation mode, and decoding the current block using the determined motion information and without decoding syntax elements representative of the motion information.

In another example, a method of encoding video data includes selecting a motion information derivation mode from a plurality of motion information derivation modes for determining motion information for a current block, wherein each motion information derivation mode of the plurality comprises performing a motion search for a first set of reference data that corresponds to a second set of reference data outside of the current block, and wherein the motion information indicates motion of the current block relative to reference video data, and determining the motion information for the current block using the selected motion information derivation mode, and encoding the current block using the determined motion information and without encoding syntax elements representative of the motion information.

In another example, a device for coding video data includes a memory configured to store a current block of video data, and one or more processors configured to select a motion information derivation mode from a plurality of motion information derivation modes for determining motion information for the current block, wherein each motion information derivation mode of the plurality comprises performing a motion search for a first set of reference data that corresponds to a second set of reference data outside of the current block, and wherein the motion information indicates motion of the current block relative to reference video data, determine the motion information for the current block using the selected motion information derivation mode, and code the current block using the determined motion information and without coding syntax elements representative of the motion information.

In another example, an apparatus for coding video data includes means for selecting a motion information derivation mode from a plurality of motion information derivation modes for determining motion information for a current block, wherein each motion information derivation mode of the plurality comprises performing a motion search for a first set of reference data that corresponds to a second set of reference data outside of the current block, and wherein the motion information indicates motion of the current block relative to reference video data, means for determining the motion information for the current block using the selected motion information derivation mode, and means for coding the current block using the determined motion information and without decoding syntax elements representative of the motion information.

In another example, a non-transitory computer-readable medium has instructions stored thereon that, when executed, cause one or more processors to select a motion information derivation mode from a plurality of motion information derivation modes for determining motion information for a current block, wherein each motion information derivation mode of the plurality comprises performing a motion search for a first set of reference data that corresponds to a second set of reference data outside of the current block, and wherein the motion information indicates motion of the current block relative to reference video data, determine the motion information for the current block using the selected motion information derivation mode, and code the current block using the determined motion information and without decoding syntax elements representative of the motion information.

In another example, a method of processing video data includes determining a candidate motion vector for deriving motion information of a current block of video data, wherein the motion information indicates motion of the current block relative to reference video data, and determining a derived motion vector for the current block based on the determined candidate motion vector, wherein determining the derived motion vector comprises performing a motion search for a first set of reference data that corresponds to a second set of reference data outside of the current block.

In another example, a device for processing video data includes a memory configured to store a current block of video data, and one or more processors configured to determine a candidate motion vector for deriving motion information of a current block of video data, wherein the motion information indicates motion of the current block relative to reference video data, and determine a derived motion vector for the current block based on the determined candidate motion vector, wherein determining the derived motion vector comprises performing a motion search for a first set of reference data that corresponds to a second set of reference data outside of the current block.

In another example, an apparatus for processing video data includes means for determining a candidate motion vector for deriving motion information of a current block of video data, wherein the motion information indicates motion of the current block relative to reference video data, and means for determining a derived motion vector for the current block based on the determined candidate motion vector, wherein the means for determining the derived motion vector comprises means for performing a motion search for a first set of reference data that corresponds to a second set of reference data outside of the current block.

In another example, a non-transitory computer-readable medium has instructions stored thereon that, when executed, cause one or more processors to determine a candidate motion vector for deriving motion information of a current block of video data, wherein the motion information indicates motion of the current block relative to reference video data, and determine a derived motion vector for the current block based on the determined candidate motion vector, wherein to determine the derived motion vector, the instructions cause the one or more processors to perform a motion search for a first set of reference data that corresponds to a second set of reference data outside of the current block.

In another example, a method of processing video data includes splitting a current block of video data into a plurality of sub-blocks for deriving motion information of the current block, wherein the motion information indicates motion of the current block relative to reference video data, deriving, separately for each respective sub-block of the plurality of sub-blocks, motion information comprising performing a motion search for a first set of reference data that corresponds to a second set of reference data outside of each respective sub-block, and decoding the plurality of sub-blocks based on the derived motion information and without decoding syntax elements representative of the motion information.

In another example, a method of processing video data includes splitting a current block of video data into a plurality of sub-blocks for deriving motion information of the current block, wherein the motion information indicates motion of the current block relative to reference video data, deriving, separately for each respective sub-block of the plurality of sub-blocks, motion information comprising performing a motion search for a first set of reference data that corresponds to a second set of reference data outside of each respective sub-block, and encoding the plurality of sub-blocks based on the derived motion information and without encoding syntax elements representative of the motion information.

In another example, a device for processing video data includes a memory configured to store a current block of video data, and one or more processors configured to split a current block of video data into a plurality of sub-blocks for deriving motion information of the current block, wherein the motion information indicates motion of the current block relative to reference video data, derive, separately for each respective sub-block of the plurality of sub-blocks, motion information comprising performing a motion search for a first set of reference data that corresponds to a second set of reference data outside of each respective sub-block, and code the plurality of sub-blocks based on the derived motion information and without coding syntax elements representative of the motion information.

In another example, a non-transitory computer-readable medium has instructions stored thereon that, when executed, cause one or more processors to split a current block of video data into a plurality of sub-blocks for deriving motion information of the current block, wherein the motion information indicates motion of the current block relative to reference video data, derive, separately for each respective sub-block of the plurality of sub-blocks, motion information comprising performing a motion search for a first set of reference data that corresponds to a second set of reference data outside of each respective sub-block, and decode the plurality of sub-blocks based on the derived motion information and without decoding syntax elements representative of the motion information.

In another example, a device for processing video data includes a memory configured to store a current picture, and one or more processors configured to obtain an encoded bitstream that contains a plurality of coded pictures, interpolate one or more reference pictures that are not included in the encoded bitstream, and decode video data of a current picture of the encoded bitstream based on the interpolated one or more reference pictures.

The details of one or more examples of the disclosure are set forth in the accompanying drawings and the description below. Other features, objects, and advantages will be apparent from the description, drawings, and claims.

DETAILED DESCRIPTION

Figure 1:
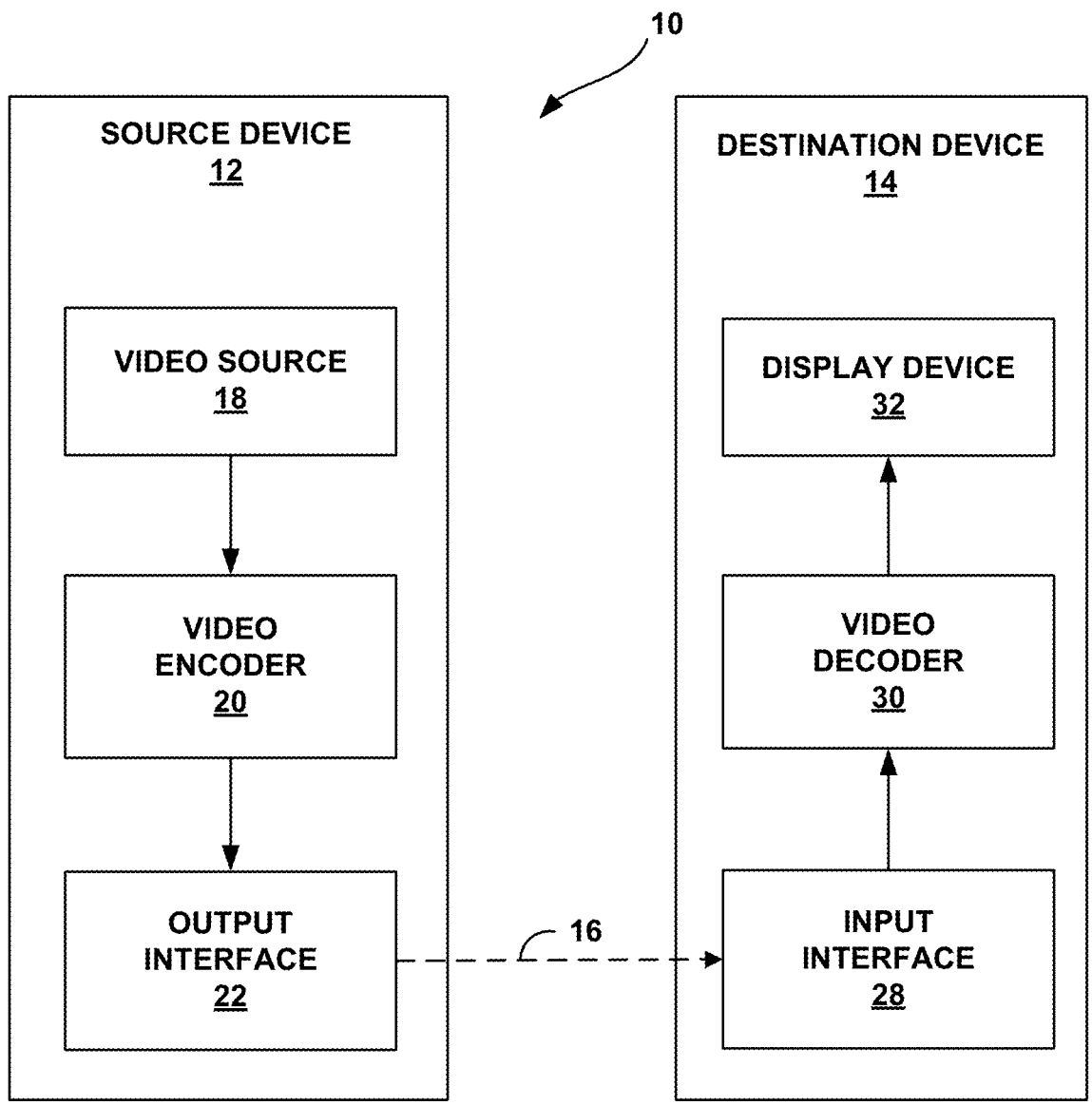
FIG. 1 is a block diagram illustrating an example video encoding and decoding system that may implement techniques of this disclosure.

Techniques of this disclosure relate to decoder side motion information derivation, block partition, and/or video data interpolation in block based video coding. The techniques may be applied to any of the existing video codecs, such as High Efficiency Video Coding (HEVC) or be an efficient coding tool for any future video coding standards.

Video coding devices implement video compression techniques to encode and decode video data efficiently. Video compression techniques may include applying spatial prediction (e.g., intra-frame prediction), temporal prediction (e.g., inter-frame prediction), and/or other prediction techniques to reduce or remove redundancy inherent in video sequences. A video encoder typically partitions each picture of an original video sequence into rectangular regions referred to as video blocks or coding units (described in greater detail below). These video blocks may be encoded using a particular prediction mode.

For inter-prediction modes, a video encoder typically searches for a block similar to the one being encoded in a frame in another temporal location, referred to as a reference frame. The video encoder may restrict the search to a certain spatial displacement from the block to be encoded. A best match may be located using a two-dimensional (2D) motion vector that includes a horizontal displacement component and a vertical displacement component. For an intra-prediction mode, a video encoder may form the predicted block using spatial prediction techniques based on data from previously encoded neighboring blocks within the same picture.

The video encoder may determine a prediction error, i.e., the difference between the pixel values in the block being encoded and the predicted block (also referred to as residual). The video encoder may also apply a transform to the prediction error, such as a discrete cosine transform (DCT), to generate transform coefficients. After transformation, the video encoder may quantize the transform coefficients. The quantized transform coefficients and motion vectors may be represented using syntax elements, and, along with control information, form a coded representation of a video sequence. In some instances, the video encoder may entropy code syntax elements, thereby further reducing the number of bits needed for their representation.

A video decoder may, using the syntax elements and control information discussed above, construct predictive data (e.g., a predictive block) for decoding a current frame. For example, the video decoder may add the predicted block and the compressed prediction error. The video decoder may determine the compressed prediction error by weighting the transform basis functions using the quantized coefficients. The difference between the reconstructed frame and the original frame is called reconstruction error.

In some instances, a video decoder or post-processing device may interpolate pictures based on one or more reference pictures. Such interpolated pictures are not included in an encoded bitstream. The video decoder or post-processing device may interpolate pictures to up-convert an original frame rate of an encoded bitstream. This process may be referred to as frame rate up-conversion (FRUC). Alternatively, the video decoder or post-processing device may interpolate pictures to insert one or more pictures that were skipped by a video encoder to encode a video sequence at a reduced frame rate. In either case, the video decoder or post-processing device interpolates frames that are not included in an encoded bitstream that has been received by the video decoder. The video decoder or post-processing device may interpolate the pictures using any of a number of interpolation techniques, e.g., using motion compensated frame interpolation, frame repeat, or frame averaging.

While certain techniques for interpolating pictures have been used for purposes of up-conversion, such techniques have not been widely used during video coding, e.g., to code video data that is included in an encoded bitstream. For example, the techniques for interpolating pictures may be relatively time intensive and/or require a relatively large amount of processing power. Accordingly, such techniques typically have not been performed in-loop when decoding video data.

According to aspects of this disclosure, a video coder (e.g., a video encoder or a video decoder) may derive motion information when coding a bitstream. For example, the video coder may generate motion information that is not included in the bitstream to code video data that is included in the bitstream. By deriving the motion information in the encoding or decoding loop, a bit savings may be achieved relative to techniques that include motion information in the bitstream (such as the above-noted inter-prediction techniques).

According to some aspects of this disclosure, a video coder may utilize a plurality of motion information derivation techniques during coding. In such examples, the video coder may determine a motion information derivation mode to determine which motion information derivation techniques to use when determining motion information for a current block. In general, using a motion information derivation mode to derive motion information may include performing a motion search for a first set of reference data that corresponds to a second set of reference data outside of the current block. For example, using the motion information derivation mode (e.g., a bilateral matching technique, a template matching technique, or another technique, as described in greater detail below), the video coder may select a motion vector candidate in a list of motion vector candidates. The video coder may select the motion vector candidate based on the motion vector candidate that identifies reference data in a reference picture that relatively closely matches data of the current picture (which may be referred to as determining a "best match" of reference data).

In some instances, the video coder may use the selected motion vector candidate to identify a search window in a reference picture. The video coder may refine the motion vector candidate based on reference data in the search window that relatively closely matches corresponding data in the current picture. That is, the video coder may derive new motion information for the current block based on the motion between the reference data in the search window that closely matches data in the current picture. The video coder may then perform motion compensation for the current block using the derived motion information. In this way, the video coder may derive motion information for a current block without motion information being signaled in an encoded bitstream.

According to aspects of this disclosure, in some examples, the video coder may split a block of video data into sub-blocks when deriving motion information. For example, the video coder may separately derive motion information for each sub-block of a larger block. In some instances, the video coder may initially determine motion information for the block and use the derived motion information as candidate motion information for each of the sub-blocks. The video coder may then further refine the derived motion information for each of the sub-blocks, e.g., using a motion information derivation mode (e.g., a bilateral matching technique, a template matching technique, or another technique, as described in greater detail below).

The techniques of this disclosure may also include techniques for interpolating pictures. In some instances, any combination of the techniques above may be used to interpolate a picture that is not included in the bitstream, e.g., similar to frame rate up-conversion. However, rather than simply adding the interpolated picture to the video sequence, a video decoder may use the interpolated frame during coding. For example, the video decoder may decode data of a current picture based on at least a portion of the interpolated picture. In some instances, the video decoder may set the interpolated picture equal to the current picture. For example, the video decoder may decode syntax data for the current picture that is included in the bitstream (e.g., slice header data and the like), interpolate the picture, and set the interpolated picture as the current picture. In other instances, the video decoder may interpolate the picture and decode data for the current picture relative to the interpolated picture. In this instance, the video decoder may add the interpolated picture to a reference picture memory for purposes of prediction.

Hence, certain techniques described herein referring to FRUC may, in some examples, be used to determine motion information (e.g., in a decoder-side motion information derivation process). In other examples, the techniques described herein referring to FRUC may be used to interpolate video data, e.g., for reference for coding video data, or for output.

FIG. 1 is a block diagram illustrating an example video encoding and decoding system 10 that may utilize techniques for deriving motion information, performing block partitioning, and/or interpolating video data. As shown in FIG. 1, system 10 includes a source device 12 that provides encoded video data to be decoded at a later time by a destination device 14. In particular, source device 12 provides the video data to destination device 14 via a computer-readable medium 16. Source device 12 and destination device 14 may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, source device 12 and destination device 14 may be equipped for wireless communication.

Destination device 14 may receive the encoded video data to be decoded via computer-readable medium 16. Computer-readable medium 16 may comprise any type of medium or device capable of moving the encoded video data from source device 12 to destination device 14. In one example, computer-readable medium 16 may comprise a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

In some examples, encoded data may be output from output interface 22 to a storage device. Similarly, encoded data may be accessed from the storage device by input interface. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device 12. Destination device 14 may access stored video data from the storage device via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system 10 may be configured to support one-way or two-way video transmission to support applications such as video streaming, video playback, video broadcasting, and/or video telephony.

In the example of FIG. 1, source device 12 includes video source 18, video encoder 20, and output interface 22. Destination device 14 includes input interface 28, video decoder 30, and display device 32. In accordance with this disclosure, video encoder 20 of source device 12 may be configured to apply the techniques for deriving motion information, performing block partitioning, and/or interpolating video data. In other examples, a source device and a destination device may include other components or arrangements. For example, source device 12 may receive video data from an external video source 18, such as an external camera. Likewise, destination device 14 may interface with an external display device, rather than including an integrated display device.

The illustrated system 10 of FIG. 1 is merely one example. Techniques for deriving motion information, performing block partitioning, and/or interpolating video data may be performed by any digital video encoding and/or decoding device. Although generally the techniques of this disclosure are performed by a video encoding device, the techniques may also be performed by a video encoder/decoder, typically referred to as a "CODEC." Moreover, the techniques of this disclosure may also be performed by a video preprocessor. Source device 12 and destination device 14 are merely examples of such coding devices in which source device 12 generates coded video data for transmission to destination device 14. In some examples, devices 12, 14 may operate in a substantially symmetrical manner such that each of devices 12, 14 include video encoding and decoding components. Hence, system 10 may support one-way or two-way video transmission between video devices 12, 14, e.g., for video streaming, video playback, video broadcasting, or video telephony.

Video source 18 of source device 12 may include a video capture device, such as a video camera, a video archive containing previously captured video, and/or a video feed interface to receive video from a video content provider. As a further alternative, video source 18 may generate computer graphics-based data as the source video, or a combination of live video, archived video, and computer-generated video. In some cases, if video source 18 is a video camera, source device 12 and destination device 14 may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by video encoder 20. The encoded video information may then be output by output interface 22 onto a computer-readable medium 16.

Computer-readable medium 16 may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from source device 12 and provide the encoded video data to destination device 14, e.g., via network transmission. Similarly, a computing device of a medium production facility, such as a disc stamping facility, may receive encoded video data from source device 12 and produce a disc containing the encoded video data. Therefore, computer-readable medium 16 may be understood to include one or more computer-readable media of various forms, in various examples.

Input interface 28 of destination device 14 receives information from computer-readable medium 16. The information of computer-readable medium 16 may include syntax information defined by video encoder 20, which is also used by video decoder 30, that includes syntax elements that describe characteristics and/or processing of blocks and other coded units, e.g., GOPs. Display device 32 displays the decoded video data to a user, and may comprise any of a variety of display devices such as a cathode ray tube (CRT), a liquid crystal display (LCD), a plasma display, an organic light emitting diode (OLED) display, or another type of display device.

Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, MUX-DEMUX units may conform to the ITU H.223 multiplexer protocol, or other protocols such as the user datagram protocol (UDP).

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device.

This disclosure may generally refer to video encoder 20 "signaling" certain information to another device, such as video decoder 30. The term "signaling" may generally refer to the communication of syntax elements and/or other data used to decode the compressed video data. Such communication may occur in real- or near-real-time. Alternately, such communication may occur over a span of time, such as might occur when storing syntax elements to a computer-readable storage medium in an encoded bitstream at the time of encoding, which then may be retrieved by a decoding device at any time after being stored to this medium.

Video encoder 20 and video decoder 30 may operate according to a video coding standard. Example video coding standards developed by the Joint Collaboration Team on Video Coding (JCT-VC) as well as Joint Collaboration Team on 3D Video Coding Extension Development (JCT-3V) of ITU-T Video Coding Experts Group (VCEG) and ISO/IEC Motion Picture Experts Group (MPEG) include High Efficiency Video Coding (HEVC) or ITU-T H.265, including its range extension, multiview extension (MV-HEVC) and scalable extension (SHVC). The finalized HEVC standard document is published as "ITU-T H.265, SERIES H: AUDIO- VISUAL AND MULTIMEDIA SYSTEMS Infrastructure of audiovisual services—Coding of moving video—High efficiency video coding," Telecommunication Standardization Sector of International Telecommunication Union (ITU), April 2013. Alternatively, video encoder 20 and video decoder 30 may operate according to other proprietary or industry standards, such as ISO/IEC MPEG-4 Visual and ITU-T H.264 (also known as ISO/IEC MPEG-4 AVC), including its Scalable Video Coding (SVC) extension and Multiview Video Coding (MVC) extension. The techniques of this disclosure, however, are not limited to any particular coding standard. For example, the techniques of this disclosure may be used with a variety of other proprietary or non-proprietary video coding techniques or subsequent standards, such as ITU-T H.266.

As noted above, for inter-prediction modes, video encoder 20 may search for a block similar to the one being encoded (a "current block") in a picture of another temporal location, referred to as a reference picture. The information used to identify the reference picture may be referred to as motion information. For example, for each block, a set of motion information can be available. A set of motion information contains motion information for forward and backward prediction directions. Here forward and backward prediction directions are two prediction directions of a bidirectional prediction mode and the terms "forward" and "backward" do not necessarily have a geometry meaning, instead they correspond to reference picture list 0 (RefPicList0) and reference picture list 1 (RefPicList1) of a current picture. When only one reference picture list is available for a picture or slice, only RefPicList0 is available and the motion information of each block of a slice is always forward.

In some cases, a motion vector together with its reference index is used in decoding processes, such a motion vector with the associated reference index is denoted as a uni-predictive set of motion information.

For each prediction direction, the motion information must contain a reference index and a motion vector. In some cases, for simplicity, a motion vector itself may be referred in a way that it is assumed that it has an associated reference index. A reference index is used to identify a reference picture in the current reference picture list (RefPicList0 or RefPicList1). A motion vector has a horizontal and a vertical component.

Picture order count (POC) is widely used in video coding standards to identify a display order of a picture. Although there are cases two pictures within one coded video sequence may have the same POC value, it typically doesn't happen within a coded video sequence. When multiple coded video sequences are present in a bitstream, pictures with a same value of POC may be closer to each other in terms of decoding order. POC values of pictures are typically used for reference picture list construction, derivation of reference picture set as in HEVC and motion vector scaling.

In H.264/AVC, each inter macroblock (MB) may be partitioned into four different ways including: one 16×16 MB partition; two 16×8 MB partitions; two 8×16 MB partitions; and four 8×8 MB partitions. Different MB partitions in one MB may have different reference index values for each direction (RefPicList0 or RefPicList1). When an MB is not partitioned into four 8×8 MB partitions, it has only one motion vector for each MB partition in each direction.

When an MB is partitioned into four 8×8 MB partitions, each 8×8 MB partition can be further partitioned into sub-blocks, each of which can have a different motion vector in each direction. There are four different ways to get sub-blocks from an 8×8 MB partition including: one 8×8 sub-block; two 8×4 sub-blocks; two 4×8 sub-blocks; and four 4×4 sub-blocks. Each sub-block can have a different motion vector in each direction. Therefore motion vector is present in a level equal to higher than sub-block.

In AVC, temporal direct mode could be enabled in either MB or MB partition level for skip or direct mode in B slices. For each MB partition, the motion vectors of the block co-located with the current MB partition in the RefPicList1 [0] of the current block are used to derive the motion vectors. Each motion vector in the co-located block is scaled based on POC distances. In AVC, a direct mode can also predict motion information from the spatial neighbors, which may be referred to as a spatial direct mode.

In HEVC, to generate an encoded representation of a picture, video encoder 20 may generate a set of coding tree units (CTUs). Each of the CTUs may comprise a coding tree block (CTB) of luma samples, two corresponding CTBs of chroma samples, and syntax structures used to code the samples of the CTBs. In monochrome pictures or pictures having three separate color planes, a CTU may comprise a single CTB block and syntax structures used to code the samples of the coding tree block.

A coding tree block may be an N×N block of samples. The size of a CTB can be ranges from 16×16 to 64×64 in the HEVC main profile (although technically 8×8 CTB sizes can be supported). A coding unit (CU) could be the same size of a CTB although and as small as 8×8. Each coding unit is coded with one mode. A CTU may also be referred to as a "tree block" or a "largest coding unit" (LCU). The CTUs of HEVC may be broadly analogous to the macroblocks of other standards, such as H.264/AVC. However, a CTU is not necessarily limited to a particular size and may include one or more coding units (CUs). A slice may include an integer number of CTUs ordered consecutively in a raster scan order.

To generate a coded CTU, video encoder 20 may recursively perform quad-tree partitioning on the coding tree blocks of a CTU to divide the coding tree blocks into coding blocks, hence the name "coding tree units." A coding block may be an N×N block of samples. A CU may comprise a coding block of luma samples and two corresponding coding blocks of chroma samples of a picture that has a luma sample array, a Cb sample array, and a Cr sample array, and syntax structures used to code the samples of the coding blocks. In monochrome pictures or pictures having three separate color planes, a CU may comprise a single coding block and syntax structures used to code the samples of the coding block.

Video encoder 20 may partition a coding block of a CU into one or more prediction blocks. A prediction block is a rectangular (i.e., square or non-square) block of samples on which the same prediction is applied. A prediction unit (PU) of a CU may comprise a prediction block of luma samples, two corresponding prediction blocks of chroma samples, and syntax structures used to predict the prediction blocks. In monochrome pictures or pictures having three separate color planes, a PU may comprise a single prediction block and syntax structures used to predict the prediction block. Video encoder 20 may generate predictive luma, Cb, and Cr blocks for luma, Cb, and Cr prediction blocks of each PU of the CU.

Video encoder 20 may use intra prediction or inter prediction to generate the predictive blocks for a PU. If video encoder 20 uses intra prediction to generate the predictive blocks of a PU, video encoder 20 may generate the predictive blocks of the PU based on decoded samples of the picture associated with the PU. If video encoder 20 uses inter prediction to generate the predictive blocks of a PU, video encoder 20 may generate the predictive blocks of the PU based on decoded samples of one or more pictures other than the picture associated with the PU. When a CU is inter coded, the CU may be further partitioned into two or four PUs. When two PUs are present in one CU, the PUs may in some instances be half size rectangles or two rectangle size with one-fourth or three-quarters size of the CU.

After video encoder 20 generates predictive luma, Cb, and Cr blocks for one or more PUs of a CU, video encoder 20 may generate a luma residual block for the CU. Each sample in the CU's luma residual block indicates a difference between a luma sample in one of the CU's predictive luma blocks and a corresponding sample in the CU's original luma coding block. In addition, video encoder 20 may generate a Cb residual block for the CU. Each sample in the CU's Cb residual block may indicate a difference between a Cb sample in one of the CU's predictive Cb blocks and a corresponding sample in the CU's original Cb coding block. Video encoder 20 may also generate a Cr residual block for the CU. Each sample in the CU's Cr residual block may indicate a difference between a Cr sample in one of the CU's predictive Cr blocks and a corresponding sample in the CU's original Cr coding block.

Furthermore, video encoder 20 may use quad-tree partitioning to decompose the luma, Cb, and Cr residual blocks of a CU into one or more luma, Cb, and Cr transform blocks. A transform block is a rectangular (e.g., square or non-square) block of samples on which the same transform is applied. A transform unit (TU) of a CU may comprise a transform block of luma samples, two corresponding transform blocks of chroma samples, and syntax structures used to transform the transform block samples. Thus, each TU of a CU may be associated with a luma transform block, a Cb transform block, and a Cr transform block. The luma transform block associated with the TU may be a sub-block of the CU's luma residual block. The Cb transform block may be a sub-block of the CU's Cb residual block. The Cr transform block may be a sub-block of the CU's Cr residual block. In monochrome pictures or pictures having three separate color planes, a TU may comprise a single transform block and syntax structures used to transform the samples of the transform block.

Video encoder 20 may apply one or more transforms to a luma transform block of a TU to generate a luma coefficient block for the TU. A coefficient block may be a two-dimensional array of transform coefficients. A transform coefficient may be a scalar quantity. Video encoder 20 may apply one or more transforms to a Cb transform block of a TU to generate a Cb coefficient block for the TU. Video encoder 20 may apply one or more transforms to a Cr transform block of a TU to generate a Cr coefficient block for the TU.

After generating a coefficient block (e.g., a luma coefficient block, a Cb coefficient block or a Cr coefficient block), video encoder 20 may quantize the coefficient block. Quantization generally refers to a process in which transform coefficients are quantized to possibly reduce the amount of data used to represent the transform coefficients, providing further compression. After video encoder 20 quantizes a coefficient block, video encoder 20 may entropy encode syntax elements indicating the quantized transform coefficients. For example, video encoder 20 may perform Context-Adaptive Binary Arithmetic Coding (CABAC) on the syntax elements indicating the quantized transform coefficients.

Video encoder 20 may output a bitstream that includes a sequence of bits that forms a representation of coded pictures and associated data. The bitstream may comprise a sequence of network abstraction layer (NAL) units. A NAL unit is a syntax structure containing an indication of the type of data in the NAL unit and bytes containing that data in the form of a raw byte sequence payload (RBSP) interspersed as necessary with emulation prevention bits. Each of the NAL units includes a NAL unit header and encapsulates a RBSP. Different types of NAL units may encapsulate different types of RBSPs. For example, a first type of NAL unit may encapsulate an RBSP for a picture parameter set (PPS), a second type of NAL unit may encapsulate an RBSP for a coded slice, a third type of NAL unit may encapsulate an RBSP for SEI, and so on. NAL units that encapsulate RBSPs for video coding data (as opposed to RBSPs for parameter sets and SEI messages) may be referred to as video coding layer (VCL) NAL units.

Video decoder 30 may receive a bitstream generated by video encoder 20. In addition, video decoder 30 may parse the bitstream to obtain syntax elements from the bitstream. Video decoder 30 may reconstruct the pictures of the video data based at least in part on the syntax elements obtained from the bitstream. The process to reconstruct the video data may be generally reciprocal to the process performed by video encoder 20. In addition, video decoder 30 may inverse quantize coefficient blocks associated with TUs of a current CU. Video decoder 30 may perform inverse transforms on the coefficient blocks to reconstruct transform blocks associated with the TUs of the current CU. Video decoder 30 may reconstruct the coding blocks of the current CU by adding the samples of the predictive blocks for PUs of the current CU to corresponding samples of the transform blocks of the TUs of the current CU. By reconstructing the coding blocks for each CU of a picture, video decoder 30 may reconstruct the picture.

When a CU is inter coded, one set of motion information is present for each PU. In addition, each PU is coded with a unique inter-prediction mode to derive a set of motion information. In HEVC standard, there are two inter prediction modes, named merge (skip is considered as a special case of merge) and advanced motion vector prediction (AMVP) modes respectively for a prediction unit (PU).

In either AMVP or merge mode, a motion vector (MV) candidate list is maintained for multiple motion vector predictors. The motion vector(s), as well as reference indices in the merge mode, of the current PU are generated by taking one candidate from the MV candidate list.

The MV candidate list contains up to five candidates for the merge mode and two candidates for the AMVP mode. A merge candidate may contain a set of motion information, e.g., motion vectors corresponding to both reference picture lists (list 0 and list 1) and the reference indices. If a merge candidate is identified by a merge index, the reference pictures are used for the prediction of the current blocks, as well as the associated motion vectors are determined. However, under AMVP mode for each potential prediction direction from either list 0 or list 1, a reference index needs to be explicitly signaled, together with an MVP index to the MV candidate list since the AMVP candidate contains only a motion vector. In AMVP mode, the predicted motion vectors can be further refined.

As can be seen above, a merge candidate corresponds to a full set of motion information while an AMVP candidate contains just one motion vector for a specific prediction direction and reference index. The candidates for both modes are derived similarly from the same spatial and temporal neighboring blocks, as described with respect to FIGS. 4 and 5 below.

According to aspects of this disclosure, as described in greater detail below, video encoder 20 and/or video decoder 30 may be configured to perform any combination of the techniques described herein for deriving motion information, performing block partitioning, and/or interpolating video data. With respect to motion information derivation, video encoder 20 and/or video decoder 30 may be configured to derive motion information by performing a motion search for a first set of reference data that corresponds to a second set of reference data outside of the current block. Correspondence may be determined based on an amount of similarity between reference data, and may be referred to herein as determining a "match" or "best match."

In some examples, video encoder 20 and/or video decoder 30 may initially code one or more syntax elements that indicate whether the motion derivation process is enabled. In some instances, the one or more syntax elements may be incorporated with another mode, such as the merge mode described above. For example, as described in greater detail with respect to the example of FIG. 10, video encoder 20 and/or video decoder 30 code one or more syntax elements when performing merge mode (e.g., a flag, an index in a merge candidate list, or the like) that indicates whether to perform motion derivation.

In instances in which motion derivation is enabled, according to aspects of this disclosure, video encoder 20 and/or video decoder 30 may perform pattern-matched motion vector derivation. For example, video encoder 20 and/or video decoder 30 may code one or more syntax elements that indicate which motion information derivation mode to apply from a plurality of motion information derivation modes. Video encoder 20 and/or video decoder 30 may code a flag to distinguish between two motion derivation information modes or an index to distinguish between more than two motion information derivation modes. As described herein, example pattern matched motion information derivation modes include bilateral matching or template matching.

During the motion derivation process, video encoder 20 and/or video decoder 30 may derive an initial motion vector for an entire block (e.g., a whole PU) based on the selected motion derivation process. For example, video encoder 20 and/or video decoder 30 may use motion vectors from a candidate list associated with the merge mode and determine which motion vector from the candidate list results in a best match. That is, video encoder 20 and/or video decoder 30 may determine which motion vector from the candidate list, when used in the selected motion derivation process, results in a first set of reference data that corresponds to a second set of reference data outside of the current block, e.g., reference data that closely matches data in the current picture or another reference picture. In general, "best match" may refer to video data that is most similar in terms of pixel differences.

Figure 8:
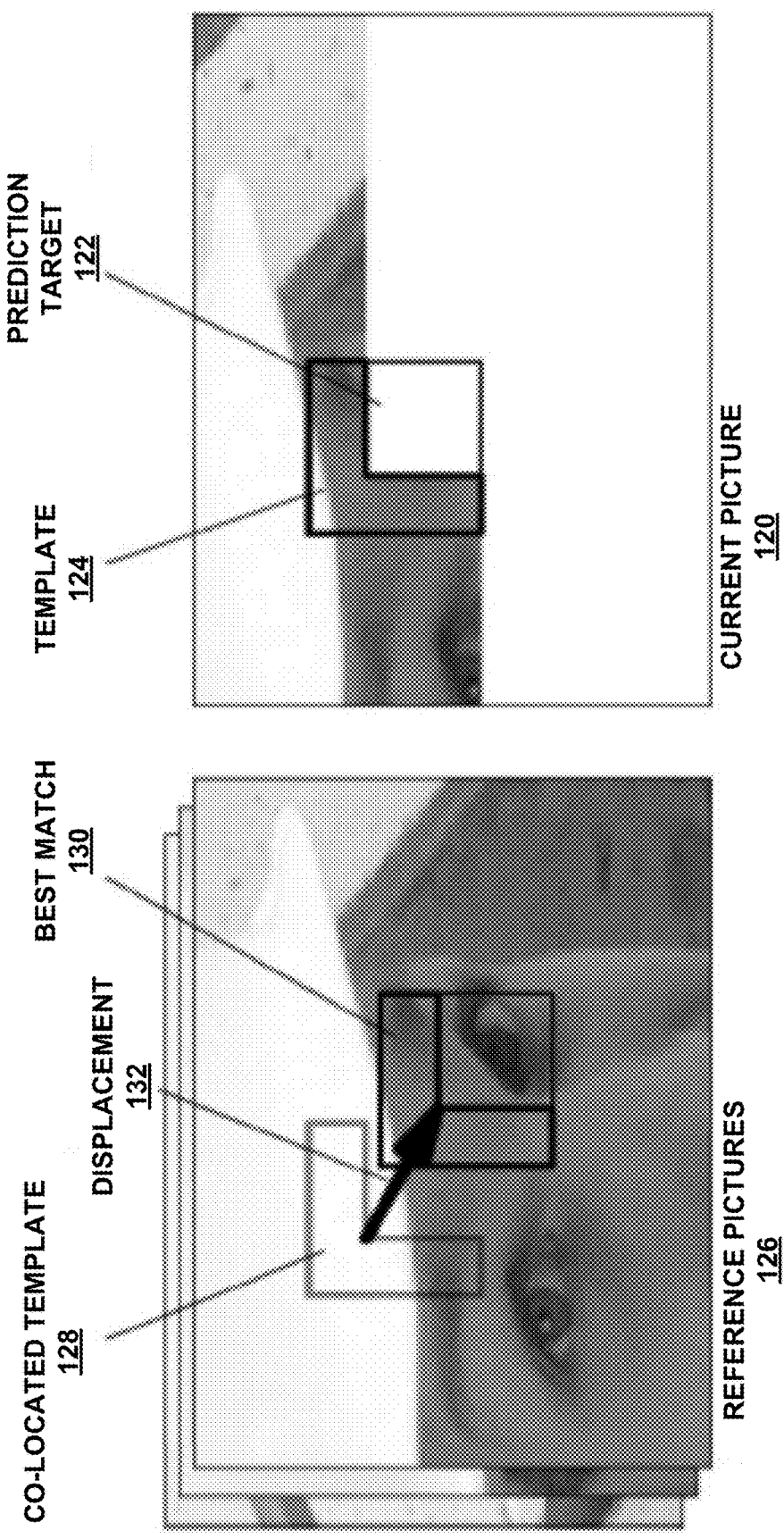
FIG. 8 is a conceptual diagram illustrating an example of template matching based decoder side motion vector derivation (DMVD).

As an example for purpose of illustration, as described in greater detail with respect to FIG. 8, video encoder 20 and/or video decoder 30 may select a template matching motion information derivation mode. In this example, video encoder 20 and/or video decoder 30 may select the motion vector candidate from the merge mode based on the most vector candidate that results in a template that most closely matches a template in a reference picture. For example, video encoder 20 and/or video decoder 30 may be configured to perform a motion search for a first set of reference data that corresponds to a second set of reference data outside of the current block, where the first set of data comprises the template in the current picture and the second set of reference data comprises the template in the reference picture. In some instances, as described in greater detail below, video encoder 20 and/or video decoder 30 may additionally or alternatively select a candidate motion vector based on a minimum matching cost.

According to aspects of this disclosure, after determining the candidate motion vector, video encoder 20 and/or video decoder 30 may further refine the candidate motion vector to derive motion information for the current block. For example, video encoder 20 and/or video decoder 30 may perform a search (e.g., a search using the motion information derivation mode) in a predefined area of the reference picture indicated by the candidate motion vector. Video encoder 20 and/or video decoder 30 may derive the motion information for the current block based on the motion vector that indicates reference data in the predefined area having a best match and/or a minimum matching cost with video data of the current picture.

In some instances, according to aspects of this disclosure, video encoder 20 and/or video decoder 30 may split the block of video data into sub-blocks when deriving motion information. For example, video encoder 20 and/or video decoder 30 may separately derive motion information for each sub-block of a larger block. In some instances, video encoder 20 and/or video decoder 30 may use the motion information derived for a block (e.g., using the above-described process) as candidate motion information for each of the sub-blocks. Video encoder 20 and/or video decoder 30 may then further refine the derived motion information for each of the sub-blocks, e.g., using a particular motion information derivation mode (e.g., a bilateral matching technique, a template matching technique, or another technique, as described in greater detail below).

Figure 2:
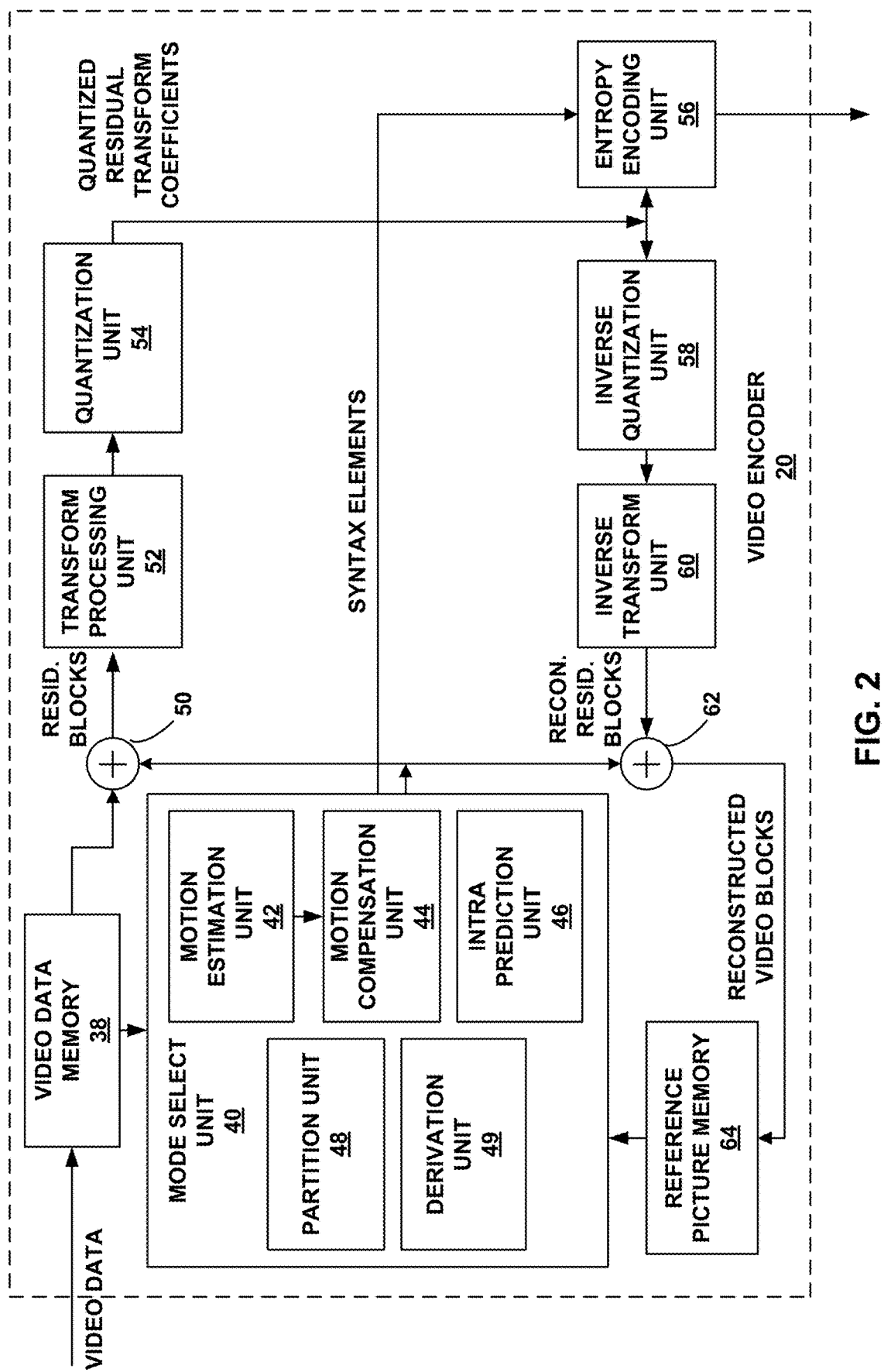
FIG. 2 is a block diagram illustrating an example of video encoder that may implement techniques of this disclosure.

FIG. 2 is a block diagram illustrating an example of video encoder 20 that may implement techniques for deriving motion information, performing block partitioning, and/or interpolating video data. Video encoder 20 may perform intra- and inter-coding of video blocks within video slices. Intra-coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based coding modes. Inter-modes, such as uni-directional prediction (P mode) or bi-prediction (B mode), may refer to any of several temporal-based coding modes.

As shown in FIG. 2, video encoder 20 receives a current video block within a video frame to be encoded. In the example of FIG. 2, video encoder 20 includes video data memory 38, mode select unit 40, reference picture memory 64, summer 50, transform processing unit 52, quantization unit 54, and entropy encoding unit 56. Mode select unit 40, in turn, includes motion compensation unit 44, motion estimation unit 42, intra-prediction unit 46, and partition unit 48. For video block reconstruction, video encoder 20 also includes inverse quantization unit 58, inverse transform unit 60, and summer 62. A deblocking filter (not shown in FIG. 2) may also be included to filter block boundaries to remove blockiness artifacts from reconstructed video. If desired, the deblocking filter would typically filter the output of summer 62. Additional filters (in loop or post loop) may also be used in addition to the deblocking filter. Such filters are not shown for brevity, but if desired, may filter the output of summer 50 (as an in-loop filter).

During the encoding process, video encoder 20 receives a video frame or slice to be coded. The frame or slice may be divided into multiple video blocks. Video data memory 38 may store the video data to be encoded by the components of video encoder 20. The video data stored in video data memory 38 may be obtained, for example, from video source 18. Reference picture memory 64 may be referred to as a DPB that stores reference video data for use in encoding video data by video encoder 20, e.g., in intra- or inter-coding modes. Video data memory 38 and reference picture memory 64 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 38 and reference picture memory 64 may be provided by the same memory device or separate memory devices. In various examples, video data memory 38 may be on-chip with other components of video encoder 20, or off-chip relative to those components.

Motion estimation unit 42 and motion compensation unit 44 perform inter-predictive coding of the received video block relative to one or more blocks in one or more reference frames to provide temporal prediction. Intra-prediction unit 46 may alternatively perform intra-predictive coding of the received video block relative to one or more neighboring blocks in the same frame or slice as the block to be coded to provide spatial prediction. Video encoder 20 may perform multiple coding passes, e.g., to select an appropriate coding mode for each block of video data.

Moreover, partition unit 48 may partition blocks of video data into sub-blocks, based on evaluation of previous partitioning schemes in previous coding passes. For example, partition unit 48 may initially partition a frame or slice into LCUs, and partition each of the LCUs into sub-CUs based on rate-distortion analysis (e.g., rate-distortion optimization). Mode select unit 40 may further produce a quadtree data structure indicative of partitioning of an LCU into sub-CUs. Leaf-node CUs of the quadtree may include one or more PUs and one or more TUs.

Mode select unit 40 may select one of the coding modes, intra or inter, e.g., based on error results, and provides the resulting intra- or inter-coded block to summer 50 to generate residual block data and to summer 62 to reconstruct the encoded block for use as a reference frame. Mode select unit 40 also provides syntax elements, such as motion vectors, intra-mode indicators, partition information, and other such syntax information, to entropy encoding unit 56.

Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a PU of a video block within a current video frame or picture relative to a predictive block within a reference frame (or other coded unit) relative to the current block being coded within the current frame (or other coded unit). A predictive block is a block that is found to closely match the block to be coded, in terms of pixel difference, which may be determined by sum of absolute difference (SAD), sum of square difference (SSD), or other difference metrics. In some examples, video encoder 20 may perform a fast motion search to determine a motion vector of a block. There are many fast motion search method proposed in the literature, such as Block-Based Gradient Descent Search (BBGDS) as described, for example, in Lurng-Kuo Liu, Ephraim Feig, "A block-based gradient descent search algorithm for block motion estimation in video coding," IEEE Trans. Circuits Syst. Video Technol., vol. 6, pp. 419-422, August 1996, Unrestricted Center-Biased Diamond Search (UCBDS), as described, for example in Jo Yew Tham, Surendra Ranganath, Maitreya Ranganath, and Ashraf Ali Kassim, "A novel unrestricted center-biased diamond search algorithm for block motion estimation," IEEE Trans. Circuits Syst. Video Technol., vol. 8, pp. 369-377, August 1998, and HEXagon-Based Search (HEBS) as described, for example, in Ce Zhu, Xiao Lin, and Lap-Pui Chau, "Hexagon-Based Search Pattern for Fast Block Motion Estimation," IEEE Trans. Circuits Syst. Video Technol., vol. 12, pp. 349-355, May 2002. Basically, these techniques include searching only a certain number of positions inside a searching window based on predefined search patterns. These techniques normally work well when motion is small and moderate.

In some examples, video encoder 20 may calculate values for sub-integer pixel positions of reference pictures stored in reference picture memory 64. For example, video encoder 20 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in reference picture memory 64. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation unit 42. Again, motion estimation unit 42 and motion compensation unit 44 may be functionally integrated, in some examples. Upon receiving the motion vector for the PU of the current video block, motion compensation unit 44 may locate the predictive block to which the motion vector points in one of the reference picture lists. Summer 50 forms a residual video block by subtracting pixel values of the predictive block from the pixel values of the current video block being coded, forming pixel difference values, as discussed below. In general, motion estimation unit 42 performs motion estimation relative to luma components, and motion compensation unit 44 uses motion vectors calculated based on the luma components for both chroma components and luma components. Mode select unit 40 may also generate syntax elements associated with the video blocks and the video slice for use by video decoder 30 in decoding the video blocks of the video slice.

Intra-prediction unit 46 may intra-predict a current block, as an alternative to the inter-prediction performed by motion estimation unit 42 and motion compensation unit 44, as described above. In particular, intra-prediction unit 46 may determine an intra-prediction mode to use to encode a current block. In some examples, intra-prediction unit 46 may encode a current block using various intra-prediction modes, e.g., during separate encoding passes, and intra-prediction unit 46 (or mode select unit 40, in some examples) may select an appropriate intra-prediction mode to use from the tested modes.

For example, intra-prediction unit 46 may calculate rate-distortion values using a rate-distortion analysis for the various tested intra-prediction modes, and select the intra-prediction mode having the best rate-distortion characteristics among the tested modes. Rate-distortion analysis generally determines an amount of distortion (or error) between an encoded block and an original, unencoded block that was encoded to produce the encoded block, as well as a bitrate (that is, a number of bits) used to produce the encoded block. Intra-prediction unit 46 may calculate ratios from the distortions and rates for the various encoded blocks to determine which intra-prediction mode exhibits the best rate-distortion value for the block.

After selecting an intra-prediction mode for a block, intra-prediction unit 46 may provide information indicative of the selected intra-prediction mode for the block to entropy encoding unit 56. Entropy encoding unit 56 may encode the information indicating the selected intra-prediction mode. Video encoder 20 may include in the transmitted bitstream configuration data, which may include a plurality of intra-prediction mode index tables and a plurality of modified intra-prediction mode index tables (also referred to as codeword mapping tables), definitions of encoding contexts for various blocks, and indications of a most probable intra-prediction mode, an intra-prediction mode index table, and a modified intra-prediction mode index table to use for each of the contexts.

According to aspects of this disclosure, as described herein, video encoder 20 may be configured to perform any combination of the techniques described herein for deriving motion information, performing block partitioning, and/or interpolating video data. In particular, certain techniques of this disclosure may be performed by derivation unit 49. For example, derivation unit 49 may be configured to determine motion information for a current block and without including data indicating the motion information in the bitstream.

In some instances, derivation unit 49 (and/or mode select unit 40) may determine whether to perform motion derivation for a particular block (e.g., versus intra-prediction or traditional inter-prediction) based on a rate distortion analysis. For example, derivation unit 49 may determine whether to perform motion derivation in a manner similar to a rate distortion cost selection as is performed for merge candidates in merge mode. In this example, derivation unit 49 may check each motion information derivation mode of a plurality of motion information derivation modes (e.g., a bilateral matching mode, template matching mode, or the like) using a rate distortion cost selection. Derivation unit 49 may further compare the motion information derivation mode having the minimal cost to other PU modes (e.g., intra-prediction modes, a traditional inter-prediction mode, a palette coding mode, or the like). In instances in which the motion derivation mode is the most efficient mode in terms of coding efficiency, video encoder 20 may encode one or more syntax elements indicating that motion information is derived (rather than signaled) for the current block. Video encoder 20 may also encode one or more syntax elements to indication the motion derivation mode from a plurality of motion information derivation modes.

In other examples, according to aspects of this disclosure, derivation unit 49 may interpolate video data that is not included in the encoded bitstream for a video sequence. For example, derivation unit 49 may perform any combination of motion derivation techniques to interpolate a picture that is not included in the bitstream, e.g., similar to frame rate up-conversion. In some instances, video encoder 20 may use the interpolated picture during encoding. For example, derivation unit 49 may interpolate a picture and video encoder 20 may encode data for a current picture relative to the interpolated picture. In this example, video encoder 20 may add the interpolated picture to reference picture memory 64 and encode data of other pictures based on at least a portion of the interpolated picture.

In other examples, derivation unit 49 may interpolate a picture and video encoder 20 may set the interpolated picture equal to the current picture. For example, derivation unit 49 may interpolate the current picture and video encoder 20 may encode syntax data for the current picture to be included in the bitstream (e.g., slice header data and the like), but may skip the encoding of video data for the current picture.

While derivation unit 49 may be configured to perform certain derivation and/or interpolation techniques, as described herein, it should be understood that one or more other units of video encoder 20 may also or alternatively be configured to interpolate data. For example, video encoder 20 may include a variety of other interpolators or filters, e.g., for interpolating a pixel at a sub-pixel (sub-pel) location during motion compensation.

Video encoder 20 forms a residual video block by subtracting the prediction data from mode select unit 40 from the original video block being coded. Summer 50 represents the component or components that perform this subtraction operation. Transform processing unit 52 applies a transform, such as a discrete cosine transform (DCT) or a conceptually similar transform, to the residual block, producing a video block comprising residual transform coefficient values. Transform processing unit 52 may perform other transforms which are conceptually similar to DCT. Wavelet transforms, integer transforms, sub-band transforms or other types of transforms could also be used.

In any case, transform processing unit 52 applies the transform to the residual block, producing a block of residual transform coefficients. The transform may convert the residual information from a pixel value domain to a transform domain, such as a frequency domain. Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Following quantization, entropy encoding unit 56 entropy codes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy coding technique. In the case of context-based entropy coding, context may be based on neighboring blocks. Following the entropy coding by entropy encoding unit 56, the encoded bitstream may be transmitted to another device (e.g., video decoder 30) or archived for later transmission or retrieval.

Inverse quantization unit 58 and inverse transform unit 60 apply inverse quantization and inverse transformation, respectively, to reconstruct the residual block in the pixel domain, e.g., for later use as a reference block. Motion compensation unit 44 may calculate a reference block by adding the residual block to a predictive block of one of the frames of reference picture memory 64. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reconstructed video block for storage in reference picture memory 64. The reconstructed video block may be used by motion estimation unit 42 and motion compensation unit 44 as a reference block to inter-code a block in a subsequent video frame.

Figure 3:
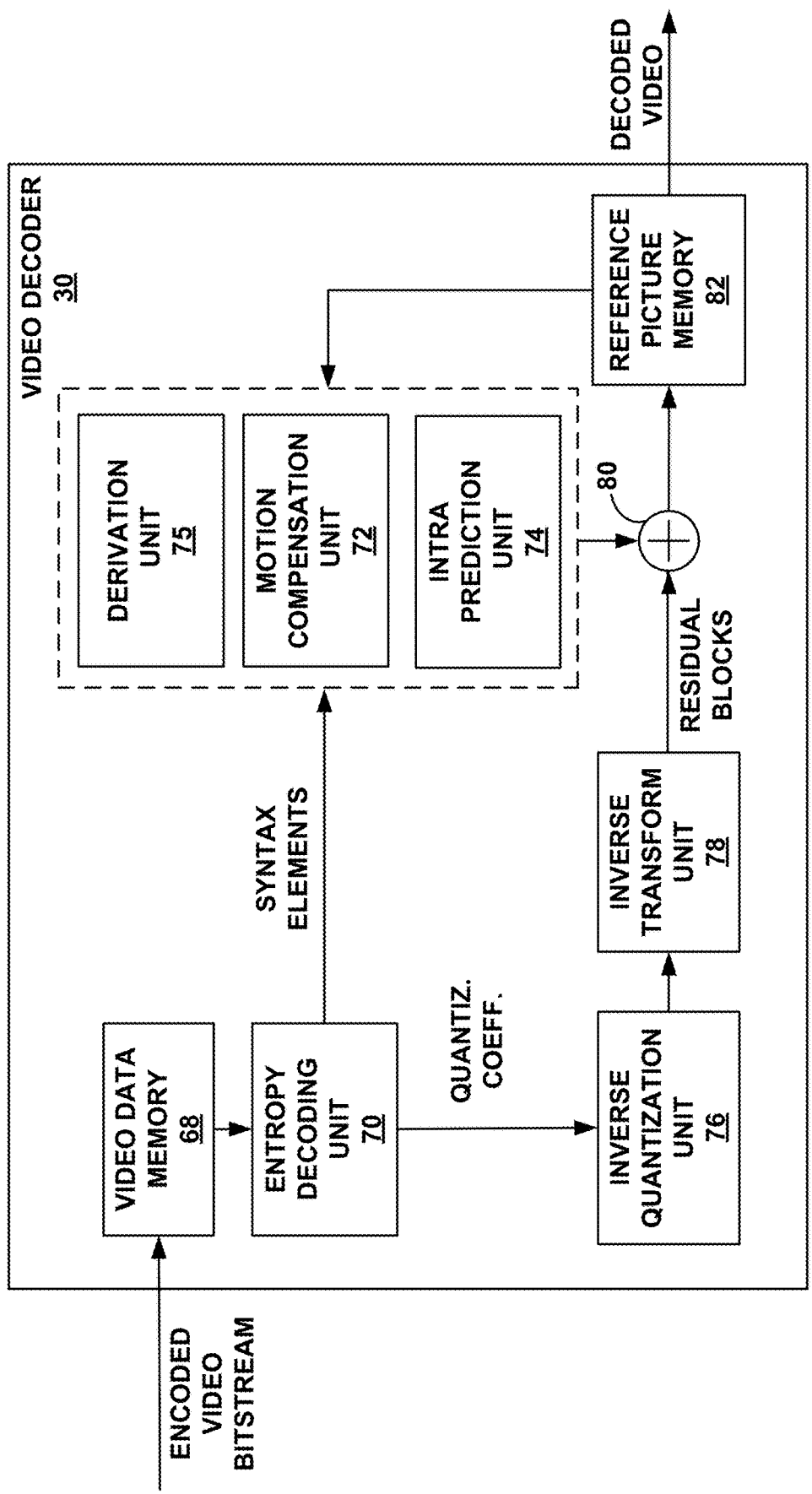
FIG. 3 is a block diagram illustrating an example of video decoder that may implement techniques of this disclosure.

FIG. 3 is a block diagram illustrating an example of video decoder 30 that may implement techniques for deriving motion information, performing block partitioning, and/or interpolating video data. In the example of FIG. 3, video decoder 30 includes video data memory 68, an entropy decoding unit 70, motion compensation unit 72, intra prediction unit 74, inverse quantization unit 76, inverse transformation unit 78, reference picture memory 82 and summer 80. Video decoder 30 may, in some examples, perform a decoding pass generally reciprocal to the encoding pass described with respect to video encoder 20 (FIG. 2). Motion compensation unit 72 may generate prediction data based on motion vectors received from entropy decoding unit 70, while intra-prediction unit 74 may generate prediction data based on intra-prediction mode indicators received from entropy decoding unit 70.

During the decoding process, video decoder 30 receives an encoded video bitstream that represents video blocks of an encoded video slice and associated syntax elements from video encoder 20. The video data stored in video data memory 68 may be obtained, for example, from computer-readable medium, e.g., from a local video source, such as a camera, via wired or wireless network communication of video data, or by accessing physical data storage media. Video data memory 68 may form a coded picture buffer (CPB) that stores encoded video data from an encoded video bitstream.

Reference picture memory 82 may be referred to as a DPB that stores reference video data for use in decoding video data by video decoder 30, e.g., in intra- or inter-coding modes. Video data memory 68 and reference picture memory 82 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 68 and reference picture memory 82 may be provided by the same memory device or separate memory devices. In various examples, video data memory 68 may be on-chip with other components of video decoder 30, or off-chip relative to those components.

Entropy decoding unit 70 of video decoder 30 entropy decodes the bitstream to generate quantized coefficients, motion vectors or intra-prediction mode indicators, and other syntax elements. Entropy decoding unit 70 forwards the motion vectors to and other syntax elements to motion compensation unit 72. Video decoder 30 may receive the syntax elements at the video slice level and/or the video block level.

When the video slice is coded as an intra-coded (I) slice, intra prediction unit 74 may generate prediction data for a video block of the current video slice based on a signaled intra prediction mode and data from previously decoded blocks of the current frame or picture. When the video frame is coded as an inter-coded (i.e., B, P or GPB) slice, motion compensation unit 72 produces predictive blocks for a video block of the current video slice based on the motion vectors and other syntax elements received from entropy decoding unit 70. The predictive blocks may be produced from one of the reference pictures within one of the reference picture lists. Video decoder 30 may construct the reference frame lists, List 0 and List 1, using default construction techniques based on reference pictures stored in reference picture memory 82.

Motion compensation unit 72 determines prediction information for a video block of the current video slice by parsing the motion vectors and other syntax elements, and uses the prediction information to produce the predictive blocks for the current video block being decoded. For example, motion compensation unit 72 uses some of the received syntax elements to determine a prediction mode (e.g., intra- or inter-prediction) used to code the video blocks of the video slice, an inter-prediction slice type (e.g., B slice, P slice, or GPB slice), construction information for one or more of the reference picture lists for the slice, motion vectors for each inter-encoded video block of the slice, inter-prediction status for each inter-coded video block of the slice, and other information to decode the video blocks in the current video slice.

Motion compensation unit 72 may also perform interpolation based on interpolation filters. Motion compensation unit 72 may use interpolation filters as used by video encoder 20 during encoding of the video blocks to calculate interpolated values for sub-integer pixels of reference blocks. In this case, motion compensation unit 72 may determine the interpolation filters used by video encoder 20 from the received syntax elements and use the interpolation filters to produce predictive blocks.

According to aspects of this disclosure, video decoder 30 may be configured to perform any combination of the techniques described herein for deriving motion information, performing block partitioning, and/or interpolating video data. In particular, certain techniques of this disclosure may be performed by derivation unit 75. For example, according to aspects of this disclosure, derivation unit 75 may be configured to determine motion information for a current block and without decoding the motion information from an encoded bitstream.

In some instances, derivation unit 75 may determine whether to perform motion derivation for a particular block (e.g., versus intra-prediction or traditional inter-prediction). For example, video decoder 30 may decode one or more syntax elements indicating that motion information is derived (rather than signaled) for a block being decoded. Video decoder 30 may also decode one or more syntax elements that indicate one motion information derivation mode from a plurality of motion information derivation modes to be used for decoding a block. Derivation unit 75 may determine whether to perform motion derivation and the motion information derivation mode for a block based on the decoded syntax. In some examples, as described herein, the syntax may be associated with one or more other modes, such as merge mode, AMVP, or other decoding functions.

According to other aspects of this disclosure, derivation unit 75 may interpolate video data that is not included in the encoded bitstream for a video sequence. For example, derivation unit 75 may perform any combination of motion derivation techniques to interpolate a picture that is not included in the parsed bitstream, e.g., similar to frame rate up-conversion. In some instances, video decoder 30 may use the interpolated picture during encoding. For example, derivation unit 75 may interpolate a picture and video decoder 30 may decode data for a current picture relative to the interpolated picture. In this example, video decoder 30 may add the interpolated picture to reference picture memory 82 and decode data of other pictures based on at least a portion of the interpolated picture.

In other examples, derivation unit 75 may interpolate a picture and video decoder 30 may set the interpolated picture equal to the current picture. For example, derivation unit 75 may interpolate the current picture and video decoder 30 may decode syntax elements for the current picture from the encoded bitstream (e.g., slice header data and the like), but may skip the decoded of video data for the current picture and instead interpolate the current picture.

While derivation unit 75 may be configured to perform certain interpolation techniques, as described herein, it should be understood that one or more other units of video decoder 30 may also or alternatively be configured to interpolate data. For example, video decoder 30 may include a variety of other interpolators or filters, e.g., for interpolating a pixel at a sub-pixel (sub-pel) location during motion compensation.

Inverse quantization unit 76 inverse quantizes, i.e., de-quantizes, the quantized transform coefficients provided in the bitstream and decoded by entropy decoding unit 70. The inverse quantization process may include use of a quantization parameter $QP_Y$ calculated by video decoder 30 for each video block in the video slice to determine a degree of quantization and, likewise, a degree of inverse quantization that should be applied.

Inverse transform unit 78 applies an inverse transform, e.g., an inverse DCT, an inverse integer transform, or a conceptually similar inverse transform process, to the transform coefficients in order to produce residual blocks in the pixel domain.

After motion compensation unit 72 generates the predictive block for the current video block based on the motion vectors and other syntax elements, video decoder 30 forms a decoded video block by summing the residual blocks from inverse transform unit 78 with the corresponding predictive blocks generated by motion compensation unit 72. Summer 80 represents the component or components that perform this summation operation. If desired, a deblocking filter may also be applied to filter the decoded blocks in order to remove blockiness artifacts. Other loop filters (either in the coding loop or after the coding loop) may also be used to smooth pixel transitions, or otherwise improve the video quality. The decoded video blocks in a given frame or picture are then stored in reference picture memory 82, which stores reference pictures used for subsequent motion compensation. Reference picture memory 82 also stores decoded video for later presentation on a display device, such as display device 32 of FIG. 1.

Figure 4B:
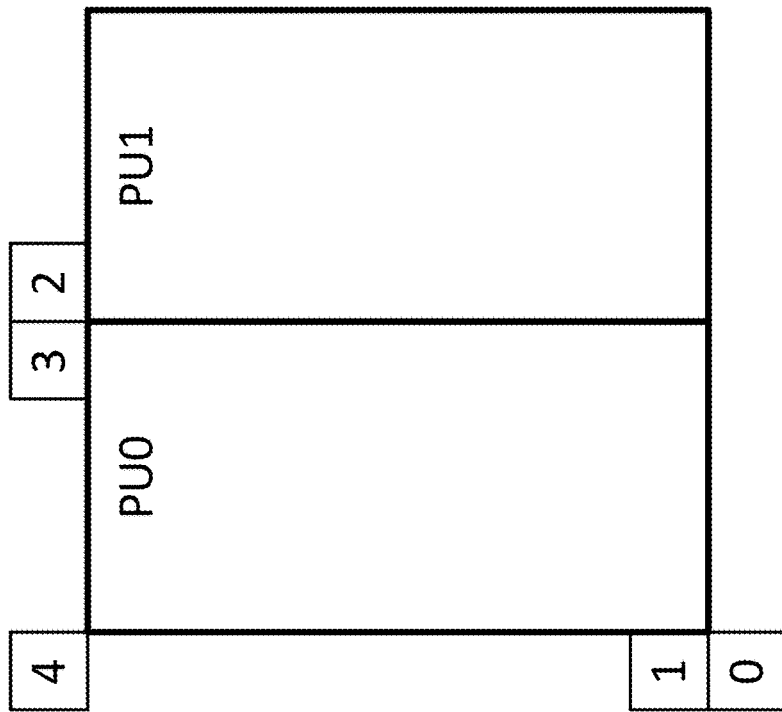
FIGS. 4A and 4B are conceptual diagrams illustrating example spatial neighboring motion vector candidates for a merge mode and an advanced motion vector prediction (AMVP) mode.
Figure 4A:
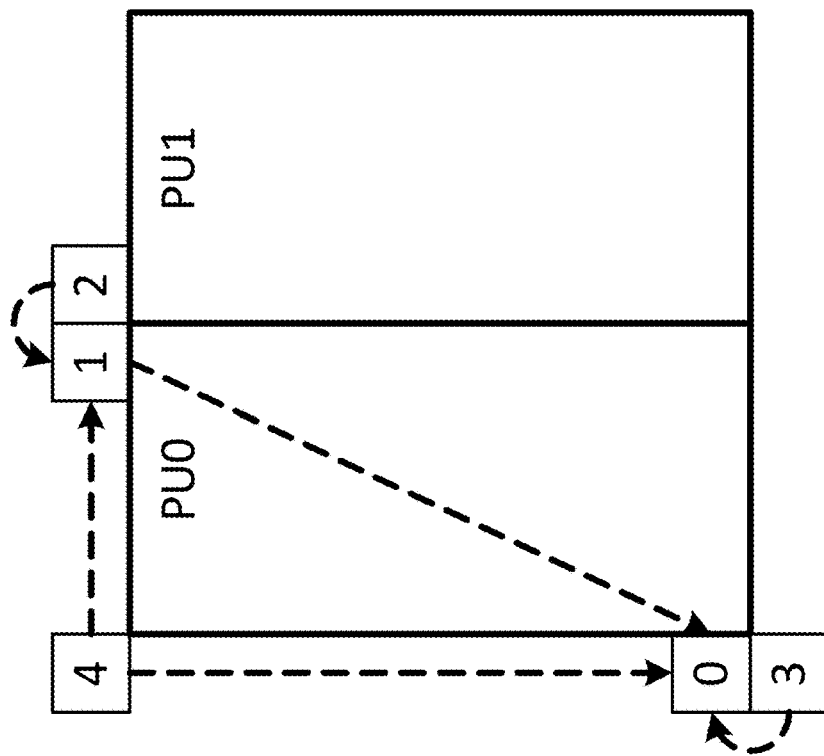

FIGS. 4A and 4B are conceptual diagrams illustrating spatial neighboring candidates in HEVC. In some examples, video encoder 20 and/or video decoder 30 may derive spatial motion vector (MV) candidates from the neighboring block 0, neighboring block 1, neighboring block 2, neighboring block 3 or neighboring block 4 for PU0.

In some instances, the techniques for generating the MV candidates from the blocks differ for merge and AMVP modes. FIG. 4A illustrates one example for merge mode. For example, in HEVC, a video coder (e.g., such as video encoder 20 and/or video decoder 30 of FIGS. 1-3) may derive up to four spatial MV candidates. The candidates may be included in a candidate list having a particular order. In one example, the order for the example of FIG. 4A may be neighboring block 0 (A1), neighboring block 1 (B1), neighboring block 2 (B0), neighboring block 3 (A0) and neighboring block 4 (B2).

FIG. 4B illustrates one example for AMVP mode. For example, in HEVC, the video coder may divide neighboring blocks into two groups: left group including of the neighboring block 0 and neighboring block 1, and above group including neighboring block 2, neighboring block 3, and neighboring block 4. For each group, the potential motion vector candidate associated with a neighboring block referring to the same reference picture as that indicated by the signaled reference index (for the block currently being coded) may have the highest priority to be chosen to form a final candidate of the group. It is possible that none of the neighboring block contain a motion vector pointing to the same reference picture. Therefore, if such a candidate cannot be found, the video coder may scale the first available candidate to form the final candidate, thus the temporal distance differences may be compensated.

According to aspects of this disclosure, motion vector candidates, such as the motion vectors associated with the neighboring blocks shown in FIGS. 4A and 4B may be used to derive a motion vector for a block. For example, the video coder may generate a candidate list that includes motion vector candidates from the neighboring blocks shown in FIGS. 4A and 4B. In this example, the video coder may use one or more of the candidates of the candidate list as an initial motion vector in a motion information derivation process (e.g., bilateral matching, template matching, or the like). The video coder may apply one or more of the motion vector candidates in a motion search of a motion vector derivation process to identify reference data. The video coder may select the candidate from the list that identifies closely matching reference data (e.g., as described with respect to FIGS. 8-9 below). For example, the video coder may perform a motion search for a first set of reference data that corresponds to a second set of reference data outside of the current block. The video coder may, in some instances, further refine the candidate, e.g., by performing an additional motion search in an area indicated by the selected candidate, to determine a derived motion vector using the motion information derivation process.

Figure 5A:
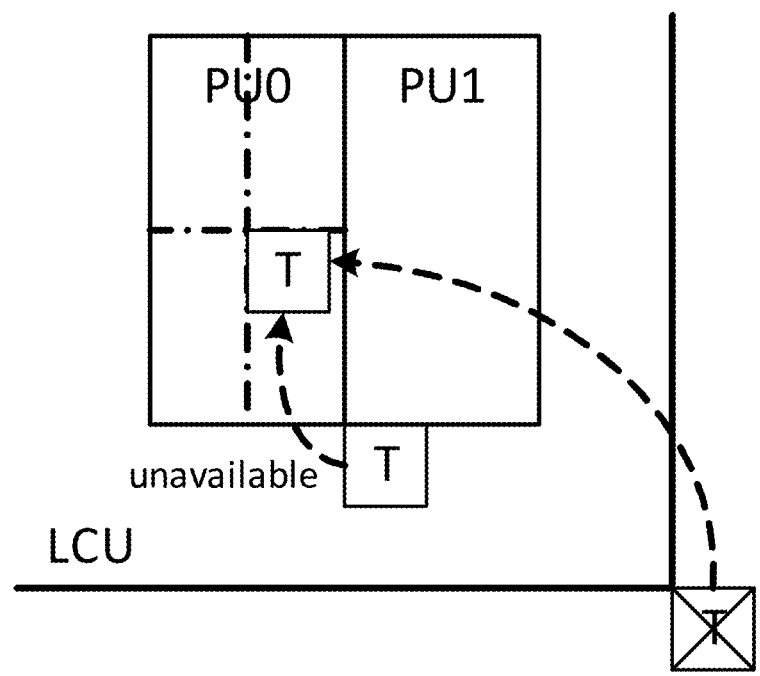
FIGS. 5A and 5B are conceptual diagrams illustrating an example temporal motion vector predictor (TMVP) candidate and motion vector scaling.
Figure 5B:
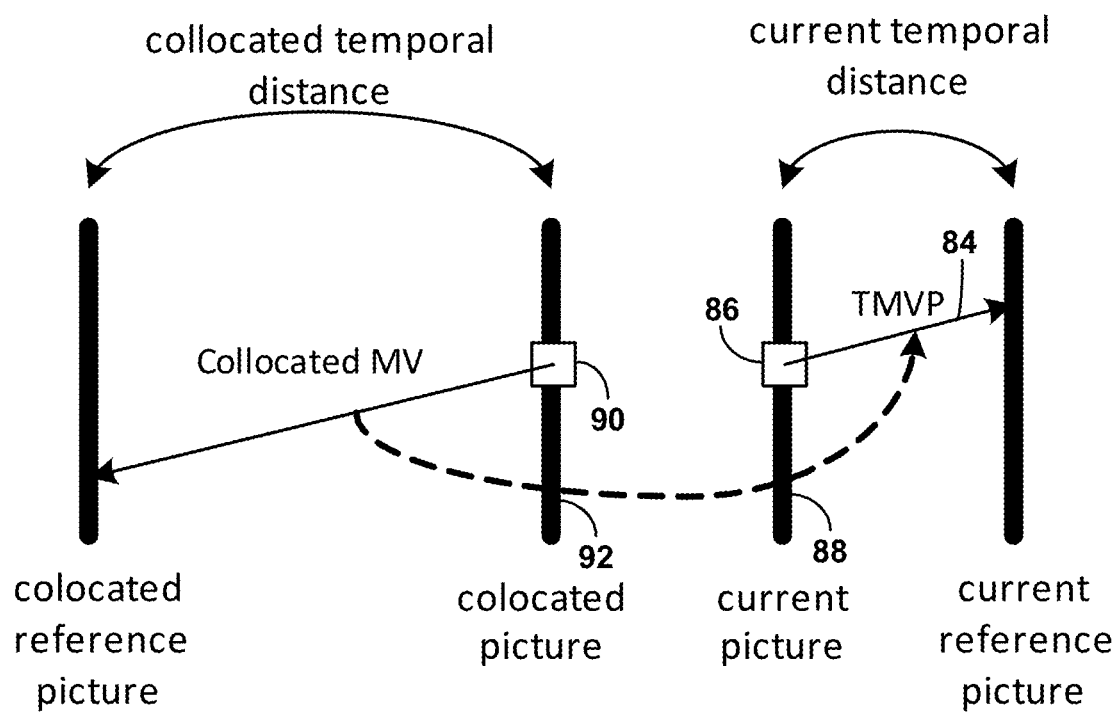

FIGS. 5A and 5B are conceptual diagrams illustrating temporal motion vector prediction in HEVC. A temporal motion vector predictor (TMVP) candidate, if enabled and available, is added into a MV candidate list after spatial motion vector candidates. In HEVC, the process of motion vector derivation for a TMVP candidate is the same for both merge and AMVP modes, however, the target reference index for the TMVP candidate in the merge mode is typically set to zero.

FIG. 5A illustrates a primary block location (shown as block "T") for a TMVP candidate, which is the bottom right block outside of the collocated PU. The location may compensate for the bias to the above and left blocks used to generate spatial neighboring candidates. However, if block T is located outside of the current CTB row or motion information is not available, the block is substituted with a center block of the PU, as illustrated by the dashed arrows from block T in FIG. 5A.

FIG. 5B illustrates deriving a TMVP candidate 84 for a current block 86 of a current picture 88 from a co-located PU 90 of a co-located picture 92, as indicated at the slice level (e.g., in a slice header). Similar to temporal direct mode in AVC, a motion vector of the TMVP candidate may be subject to motion vector scaling, which is performed to compensate the distance differences, e.g., temporal distances between pictures. With respect to motion vector scaling, a video coder (such as video encoder 20 and/or video decoder 30) may be configured to initially determine that the value of motion vectors is proportional to the distance of pictures in the presentation time. A motion vector associates two pictures, the reference picture, and the picture containing the motion vector (namely, the containing picture). When a motion vector is utilized to predict the other motion vector, the distance of the containing picture and the reference picture is calculated based on the Picture Order Count (POC) values.

For a motion vector to be predicted, both the associated containing picture for the motion vector and a reference picture of the motion vector may be different. Therefore, the video coder may calculate a new distance based on POC values, and the video coder may scale the motion vector based on these two POC distances. For a spatial neighboring candidate, the containing pictures for the two motion vectors are the same, while the reference pictures are different. In HEVC, motion vector scaling applies to both TMVP and AMVP for spatial and temporal neighboring candidates.

In some examples, a video coder may be configured to determine one or more artificial motion vector candidates. For example, if a motion vector candidate list is not complete, the video coder may generate artificial motion vector candidates and insert the artificial motion vector candidates at the end of the list until the list includes a predetermined number of entries. In merge mode, there are two types of artificial MV candidates including a combined candidate derived only for B-slices and a zero candidate. In some instances, the zero candidate is used only for AMVP if the combined type does not provide enough artificial candidates.

For each pair of candidates that are already in the candidate list and have necessary motion information, bidirectional combined motion vector candidates are derived by a combination of the motion vector of the first candidate referring to a picture in the list 0 and the motion vector of a second candidate referring to a picture in the list 1.

According to aspects of this disclosure, motion vector candidates, such as the TMVP shown in FIGS. 5A and 5B, may be used to derive a motion vector for a block. For example, the video coder may generate a candidate list that includes a TMVP determined according to process described above. In this example, the video coder may use the TMVP as an initial motion vector in a motion information derivation process (e.g., bilateral matching, template matching, or the like). The video coder may apply the TMVP in a motion vector derivation process to identify reference data. The video coder may select the TMVP in instances in which the TMVP identifies closely matching reference data (e.g., as described with respect to FIGS. 8-9 below). The video coder may, in some instances, further refine the TMVP to determine a derived motion vector using the motion information derivation process.

In some examples, the video coder may prune a candidate list that includes motion vector candidates (such as those described with respect to FIGS. 4A-5B). For example, in some instances, candidates from different blocks may happen to be the same, which decreases the efficiency of a merge/AMVP candidate list. The video code may apply a pruning process to solve this problem. The video coder may compare one candidate against the others in the current candidate list to avoid inserting an identical candidate. To reduce the complexity, the video coder may apply only limited numbers of pruning processes instead of comparing each potential one with all the other existing ones.

Figure 6:
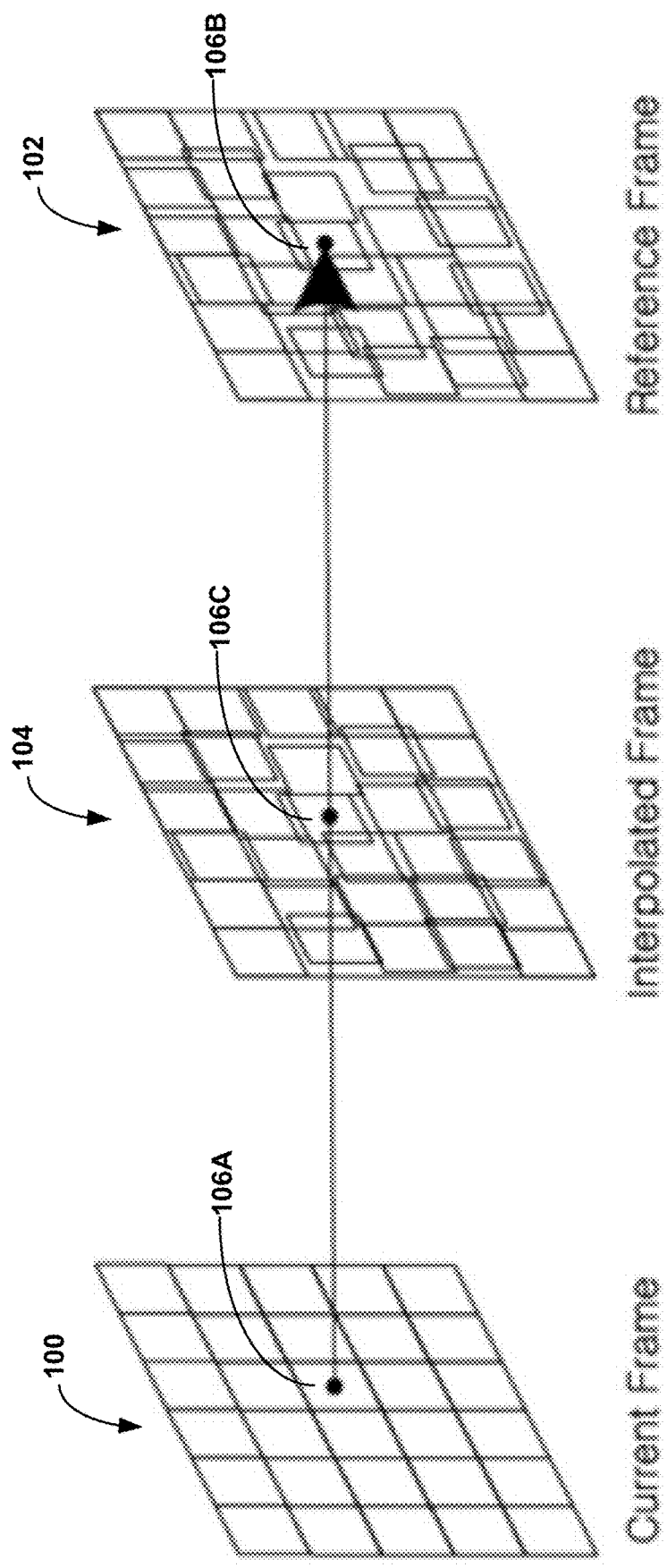
FIG. 6 is a conceptual diagram illustrating an example of unilateral motion estimation (ME) in frame rate up-conversion (FRUC).

FIG. 6 is a conceptual diagram illustrating an example of unilateral motion estimation (ME) in frame rate up-conversion (FRUC). In particular, FIG. 6 illustrates a current frame 100, a reference frame 102, and an interpolated frame 104. In some instances, a video decoder or post-processing device may interpolate pictures based on one or more reference pictures. The video decoder or post-processing device may interpolate pictures to up-convert an original frame rate of an encoded bitstream. Alternatively, the video decoder or post-processing device may interpolate pictures to insert one or more pictures that were skipped by a video encoder to encode a video sequence at a reduced frame rate. In either case, the video decoder or post-processing device interpolates frames (such as interpolated frame 104) that are not included in an encoded bitstream that has been received by the video decoder using pictures that have been decoded (such as current frame 100 and reference frame 102). The video decoder or post-processing device may interpolate the pictures using any of a number of interpolation techniques, e.g., using motion compensated frame interpolation, frame repeat, or frame averaging.

The above-noted frame interpolation techniques are typically implemented post-loop. For example, a video decoder typically receives and decodes an encoded bitstream to generate a reconstructed representation of a video sequence including current frame 100 and reference frame 102. Following the decoding loop, the video decoder or another post processing device may interpolate pictures to be included with the reconstructed representation including interpolated frame 104. In some instances, the process of interpolating picture may be referred to as frame rate up-conversion (FRUC), because the resulting sequence of pictures includes additional (interpolated) pictures that were not included in the encoded bitstream.

Accordingly, FRUC technology may be used to generate high-frame-rate videos based on low-frame-rate videos. FRUC has been used in display industry. Examples include H. Liu, R. Xiong, D. Zhao, S. Ma, W. Gao, "Multiple Hypotheses Bayesian Frame Rate Up-Conversion by Adaptive Fusion of Motion-Compensated Interpolations", IEEE transactions on circuits and systems for video technology, vol. 22, No. 8, August 2012; W. H. Lee, K. Choi, J. B. Ra, "Frame rate up conversion based on variational image fusion", IEEE transactions on image processing, vol. 23, No. 1, January 2014; and U. S. Kim, M. H. Sunwoo, "New frame rate up-conversion algorithms with low computational complexity", IEEE transactions on circuits and systems for video technology, vol. 24, No. 3, March 2014.

FRUC algorithms may be divided into two types. One type of methods interpolate intermediate frames by simple frame repetition or averaging. However, this method provides improper results in a picture that contains a lot of motion. The other type of method, called motion-compensated FRUC (MC-FRUC), considers object movement when it generates intermediate frames and consists of two steps: motion estimation (ME) and motion-compensated interpolation (MCI). ME generates motion vectors (MVs), which represent object motion using vectors, whereas MCI uses MVs to generate intermediate frames.

The block-matching algorithm (BMA) is widely used for ME in MC-FRUC as it is simple to implement. BMA divides an image into blocks and detects the movement of those blocks, e.g., to determine whether the blocks correspond. Two kinds of ME are primarily used for BMA: unilateral ME and bilateral ME.

As shown in FIG. 6, unilateral ME obtains MVs by searching the best matching block from reference frame 102 of current frame 100. Then the block on the motion trajectory in the interpolated frame can be located so that the MV is achieved. As shown in FIG. 6, three blocks including 106A, 106B, and 106C from current frame 100, reference frame 102 and interpolated frame 104, respectively, are involved following the motion trajectory. Although block 106A in current frame 100 belongs to a coded block, the best matching block 106B in reference frame 102 may not fully belong to a coded block, and neither does block 106C in interpolated frame 104. Consequently, overlapped regions of the blocks and un-filled (holes) regions may occur in the interpolated frame.

To handle overlaps, simple FRUC algorithms merely involve averaging and overwriting the overlapped pixels. Moreover, holes are covered by the pixel values from a reference or a current frame. However, these algorithms result in blocking artifacts and blurring. Hence, motion field segmentation, successive extrapolation using the discrete Hartley transform, and image inpainting are proposed to handle holes and overlaps without increasing blocking artifacts and blurring.

According to aspects of this disclosure, a video coder (such as video encoder 20 and/or video decoder 30) may generate interpolated frame 104 in the encoding or decoding loop using the unilateral matching technique shown in FIG. 6. For example, the video coder may use picture level FRUC to interpolate interpolated frame 104 as a predictor of the current picture, using the reconstructed pixel array. In some examples, such an interpolated picture may be considered as a reference picture or the reconstruction of current frame 100. In other examples, the video coder may set the current picture equal to the interpolated picture. Such a picture may be marked as a discardable picture and/or non-reference picture by syntax elements or decoding processes.

In some examples, the video coder may interpolate a current picture such that a FRUC mode is the only allowed mode, where the FRUC mode indicates the unilateral matching technique shown in FIG. 6 or any other motion information derivation or interpolation techniques described herein. Hence, instead of a quad-tree based CU structure signaling, all blocks may have the same predefined or signaled size. In some instances, only a subset of valid CU coding modes, such as regular skip, regular merge, FRUC mode, and intra mode may be allowed. Alternatively or additionally, a hole filling mode for FRUC may be allowed in such a picture or slice.

According to aspects of this disclosure, an SEI message may be introduced to indicate which pictures or sub-sequence of pictures are coded by picture level FRUC. Such pictures may be discarded without impacting the quality of the other pictures. Such an SEI message may indicate (or additionally indicate) which temporal level(s) contain FRUC coded pictures, or contain only FRUC coded pictures. Such information in SEI message can also be present as other places of the high level syntax, such as PPS, SPS and VPS.

In some examples, a video coder may code a portion of a picture and interpolate the remaining video data. For example, the video coder may code a so-called "hint" for decoder side frame rate up-conversion, which may allow smart or resource rich decoders to optionally generate the FRUC frames. For example, several key regions (such as rectangle regions) can be signaled as a hint for such FRUC frames. When the hint is received and optionally processed, the FRUC method specified as part of the decoder may be used first for the regions that are not key regions, while the key regions have to be processed further by the means that may not be specified by the decoder, such as hole filling methods.

With respect to hole filling, according to aspects of this disclosure, a video coder may implement block-based hole filling techniques. For example, one hole filling technique is to use spatially neighboring inter blocks to predict the current intra block in the same CTU. For example, the video coder may encode/decode a CTU twice. The first encoding/decoding is as normal. In the second round, only intra blocks are encoded/decoded and overwritten. For an intra block, all its spatially neighboring inter blocks in the same CTU, including those to the bottom-right of the current block, are marked as available for intra prediction. The hole filling method can also be slice, tile, picture, other any other level. Another hole filling method may use an image inpainting technique. Other hole filling techniques may also apply.

Figure 7:
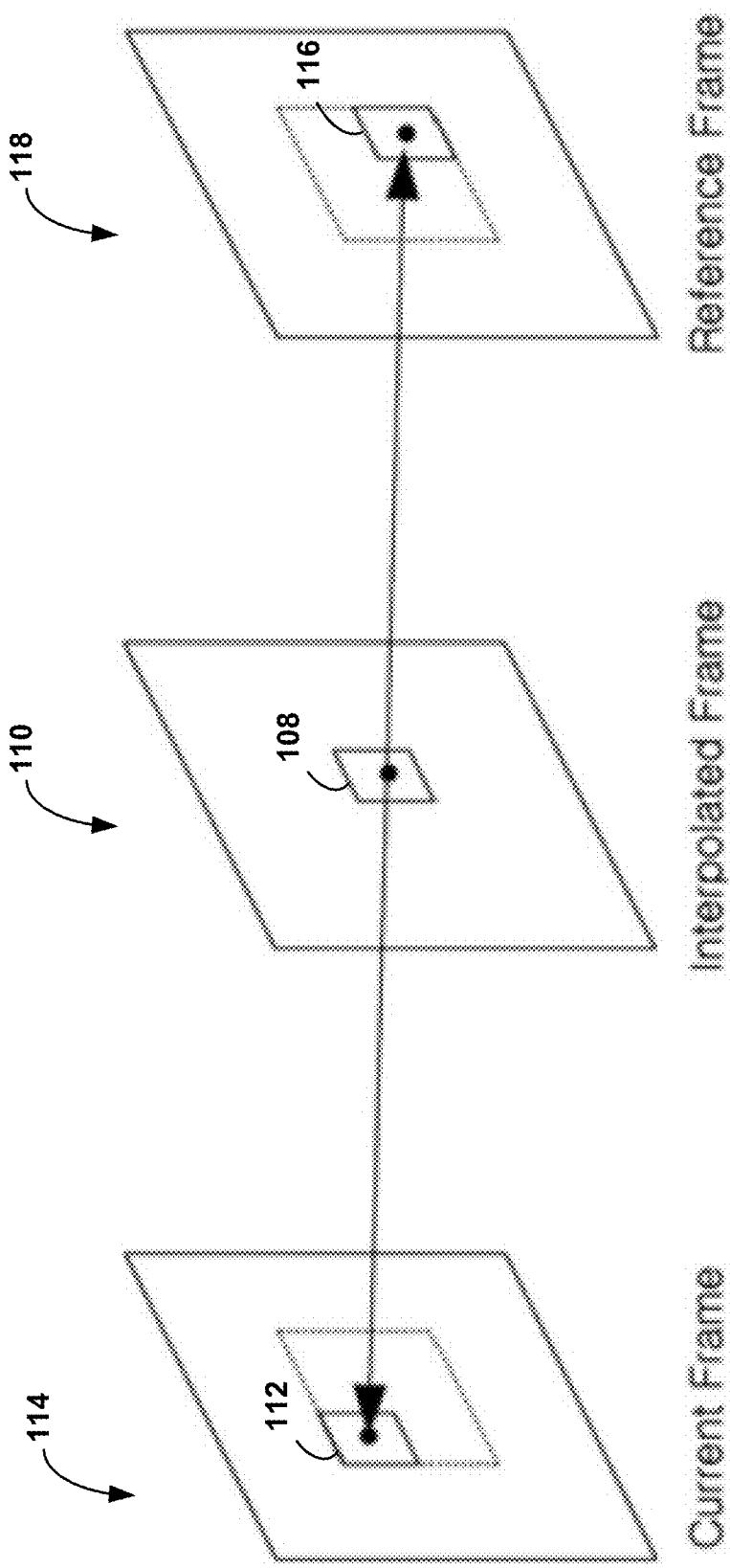
FIG. 7 is a conceptual diagram illustrating an example of bilateral motion estimation (ME) in FRUC.

FIG. 7 is a conceptual diagram illustrating an example of bilateral motion estimation (ME) in FRUC. In particular, FIG. 7 illustrates an interpolated block 108 of an interpolated frame 110 that is interpolated from a current block 112 of a current frame 114 and a reference block 116 of a reference frame 118. As shown in FIG. 7, bilateral ME is another solution (in MC-FRUC) that can be used to avoid the problems caused by overlaps and holes shown in FIG. 6. Bilateral ME obtains MVs passing through interpolated block 108 using the temporal symmetry between blocks 112 and 116 of current frame 114 and reference frame 118, respectively. As a result, it does not generate overlaps and holes. Since it is assumed the current block is a block that is being processed, in a certain order, e.g., as in the case of video coding, a sequence of such blocks would cover the whole intermediate picture without overlap. For example, in the case of video coding, blocks can be processed in the decoding order.

According to aspects of this disclosure, the bilateral motion estimation shown in the example of FIG. 7 may be leveraged to derive motion information. For example, as described in greater detail with respect to FIG. 9 below, a video coder (such as video encoder 20 or video decoder 30) may apply bilateral matching as a motion information derivation mode to derive motion information during coding. In bilateral matching, the video coder may performing a motion search for a first set of reference data in a first reference picture that corresponds to a second set of reference data in a second reference picture.

According to other aspects of this disclosure, a video coder (such as video encoder 20 and/or video decoder 30) may generate the interpolated frame in the encoding or decoding loop using the bilateral matching technique shown in FIG. 7. For example, the video coder may use picture level FRUC to interpolate the interpolated picture as a predictor of the current picture, using the reconstructed pixel array. In some examples, such an interpolated picture may be considered as a reference picture or the reconstruction of the current picture. In other examples, the video coder may set the current picture equal to the interpolated picture. Such a picture may be marked as a discardable picture and/or non-reference picture by syntax elements or decoding processes.

FIG. 8 is a conceptual diagram illustrating an example of template matching based decoder side motion vector derivation (DMVD). With advanced video codecs, the bit percentage of motion information in bitstream becomes more and more. In some instances, DMVD may reduce the bit cost of motion information. Template matching based DMVD may exhibit a coding efficiency improvement, as described, for example, in S. Kamp, M. Wien, "Decoder-side motion vector derivation for block-based video coding", IEEE transactions on circuits and systems for video technology, vol. 22, No. 12, December 2012.

In the example of FIG. 8, a current picture 120 includes a prediction target 122 (e.g., a block currently being coded) and a template 124. Reference pictures 126 include a co-located template 128, a best match 130, and a displacement vector 132. A video coder (such as video encoder 20 and/or video decoder 30) may use template 124 to search for a best match for prediction target 122 (e.g., rather than using the prediction target 122 itself, which is yet to be coded). For example, the video coder may perform a motion search to identify a first set of reference data (e.g., best match 130) that corresponds to a second set of reference data outside of prediction target 122 (e.g., template 124). As noted above, correspondence may be determined based on an amount of similarity between reference data, and may be referred to herein as determining a "match" or "best match."

In the example shown, the video coder may identify co-located template 128 in reference pictures 126. The video coder may then search for best match 130, which includes pixel values that are similar to template 124. The video coder may determine displacement vector 132 based on the displacement of co-located template 128 and best match 130 in reference pictures 126.

Assuming template 124 and prediction target 122 are from the same object, the motion vector of the template can be used as the motion vector of the prediction target. Hence, in the example of FIG. 8, the video coder may apply displacement vector 132 to prediction target 122. Since the template matching is conducted at both a video encoder and a video decoder, the motion vector can be derived at decoder side to avoid signaling cost.

According to aspects of this disclosure, the video coder may apply template matching as a motion information derivation mode. For example, the video coder may apply template matching to derive motion information of a current block by locating a best match between template 124 of current picture and corresponding reference data in reference pictures 126. While the example of FIG. 8 illustrates template 124 as an L-shaped block of video data, it should be understood that other templates may be used. For example, the video coder may use multiple blocks as a template, e.g., one or more blocks positioned to the left of prediction target 122 and one or more blocks positioned above prediction target 122.

According to aspects of this disclosure, the video coder may apply the template matching techniques shown in FIG. 8 using one or more motion vectors from a candidate list of motion vectors. For example, the video coder may be configured to determine one or more candidate motion vectors using any combination of techniques described herein (e.g., merge mode candidates, AMVP candidates, a TMVP, or the like). The video coder may then be configured to apply one or more of the candidate motion vectors to template 124 to locate co-located template 128 (in this example, the location of co-located template 128 is dictated by the one or more candidate motion vectors and not necessarily strictly co-located). The video coder may be configured to determine which of the candidate motion vectors results in a best match between template 124 and co-located template 128.

According to aspects of this disclosure, the video coder may then be configured to refine the candidate motion vector to derive motion information for prediction target 122. For example, the video coder may search for a best match for template 124 in a region of reference pictures 126 identified by the candidate motion vector. Upon determining a best match, the video coder may determine a displacement between template 124 and the determined based match. The video coder may designate the displacement as a derived motion vector for prediction target 122.

Figure 9:
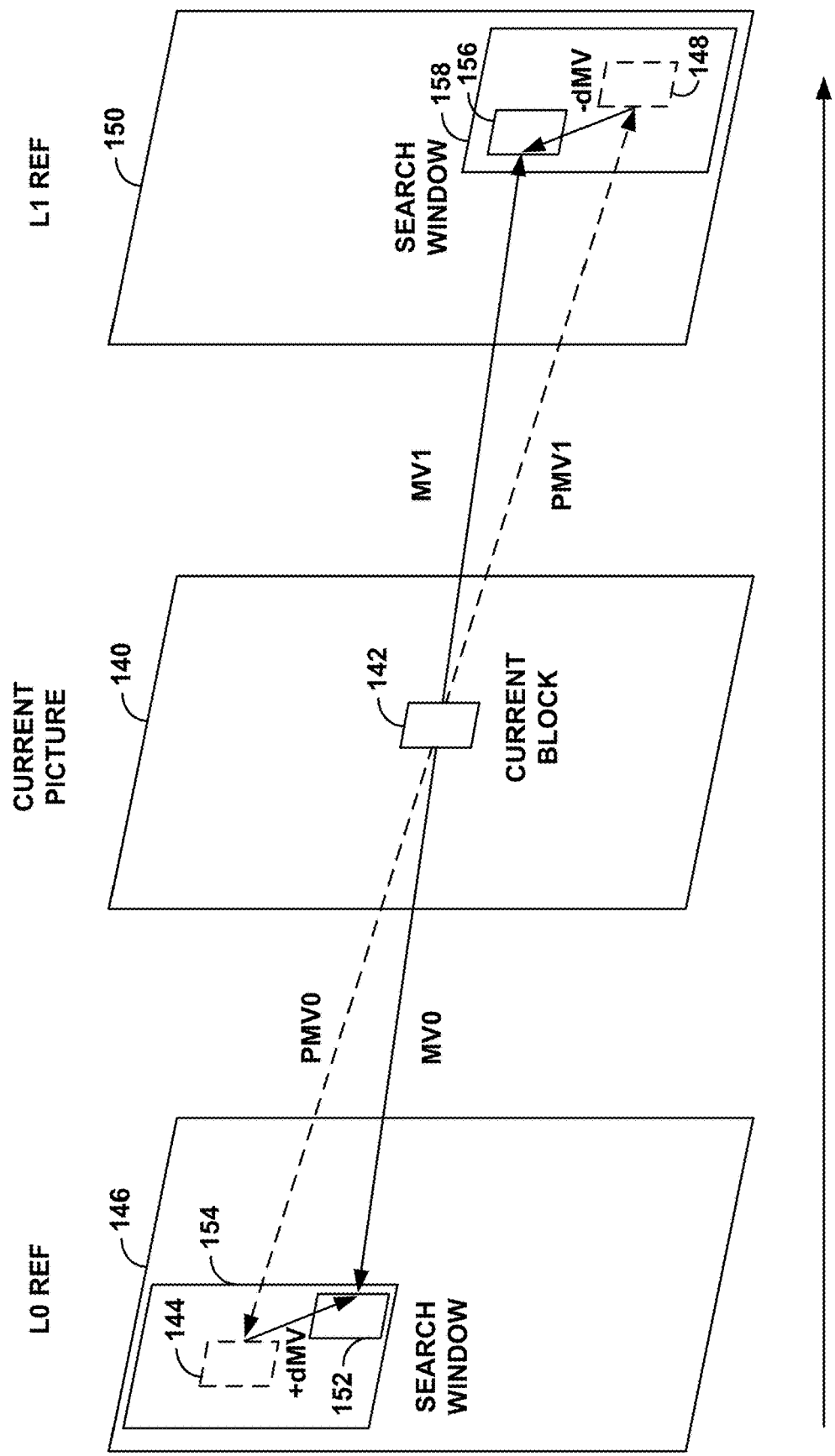
FIG. 9 is a conceptual diagram illustrating an example of mirror based bidirectional motion vector derivation in DMVD.

FIG. 9 is a conceptual diagram illustrating an example of bidirectional motion vector derivation in DMVD. Another category of DMVD is mirror based bidirectional MV derivation, as described, for example, in Y.-J. Chiu, L. Xu, W. Zhang, H. Jiang, "Decoder-side Motion Estimation and Wiener filter for HEVC", Visual communications and Image Processing (VCIP), 2013. The concept of bidirectional motion vector derivation in DMVD may be akin to bilateral ME in FRUC. For example, mirror-based MV derivation may be applied by Centro-symmetric motion estimation around search centers in fractional sample accuracy.

The example of FIG. 9 includes current picture 140 having current block 142 (the block currently being coded), a first candidate motion vector PMV0 that identifies a first template block 144 of a first reference picture 146 (L0 ref), and a second candidate motion vector PMV1 that identifies a second template block 148 of a second reference picture 150. The video coder may apply dMV as an offset to locate a first reference block 152 in search window 154 of first reference picture 146 and to locate a second reference block 156 in search window 158 of second reference picture 150.

For example, the video coder may add dMV to PMV0 and subtract dMV from PMV1 to generate an MV pair, MV0 and MV1. The video coder may check all values of dMV inside search window 154 and 158 to determine which value of dMV results in the best match between first reference block 152 (e.g., a first set of reference data) of L0 ref and second reference block 156 (e.g., a second set of reference data) of L1 ref. In some examples, the video coder may determine the best match based on the Sum of Absolute Difference (SAD). In other examples, the video coder may use another metric to determine the best match. The size and location of search windows 154 and 158 may be pre-defined or may be signaled in a bitstream.

The video coder may select the MV pair with the minimum SAD as the output of Centro-symmetric motion estimation. Since this technique uses a future reference (reference at a temporal position later than the current frame) and an earlier reference (reference at a temporal position earlier than the current frame) for the SAD matching, it is cannot be applied to P frame or low-delay B frames in which only former reference is available.

According to aspects of this disclosure, the video coder may apply the bidirectional motion vector derivation techniques as a motion information derivation mode. In some examples, the video coder may apply the techniques shown in FIG. 9 using one or more motion vectors from a candidate list of motion vectors. For example, the video coder may be configured to determine one or more candidate motion vectors using any combination of techniques described herein (e.g., merge mode candidates, AMVP candidates, a TMVP, or the like). The video coder may then be configured to apply one or more of the candidate motion vectors as PMV0 and/or PMV1 to locate first template block 144 and second template block 148. The video coder may be configured to determine which of the candidate motion vectors results in a best match between first template block 144 and second template block 148.

According to aspects of this disclosure, the video coder may then be configured to refine the candidate motion vector to derive motion information for current block 142. For example, the video coder may search for a best match by applying a variety of values of dMV, in the manner described above. In this way, the video coder may derive MV pair MV0 and MV1.

Figure 10:
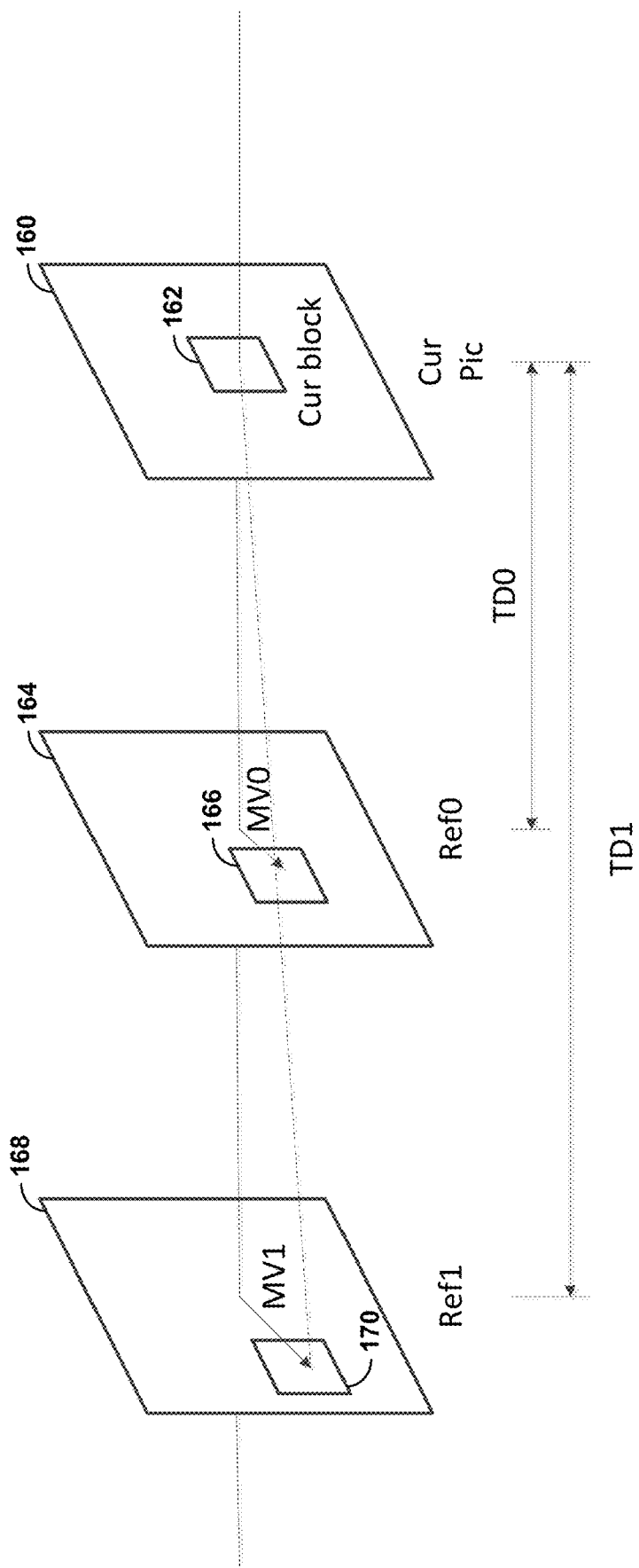
FIG. 10 is a conceptual diagram illustrating extended bilateral matching based motion vector derivation.
Figure 11:
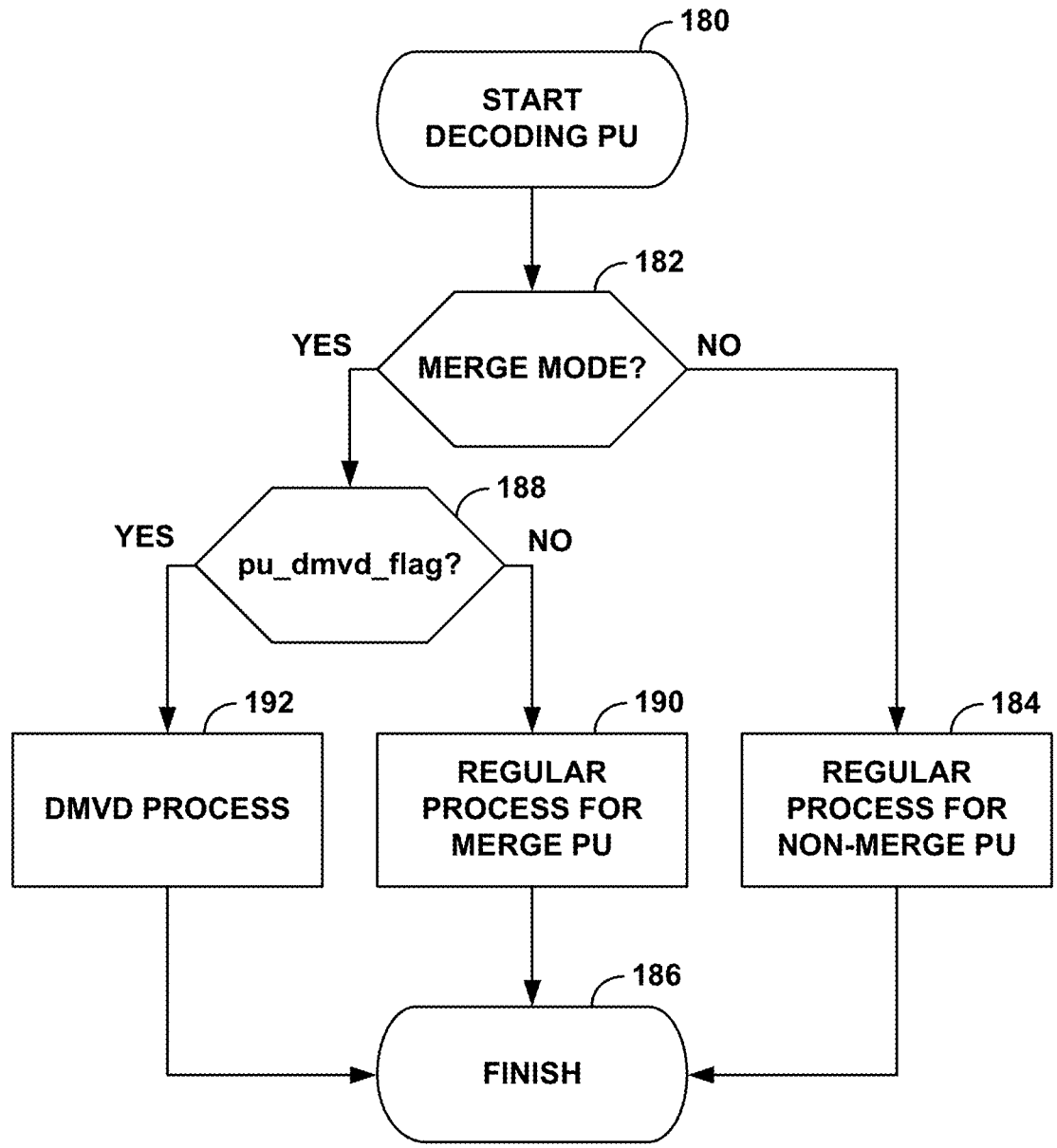
FIG. 11 is a flowchart illustrating an example of decoding a prediction unit (PU) using DMVD.

FIG. 11 is a conceptual diagram illustrating extended bilateral matching based motion vector derivation. One potential drawback of mirror based bidirectional MV derivation (e.g., as shown in FIG. 10) is that it does not work when two references of the current picture are both earlier or both later than the current picture. The extended bilateral matching techniques described herein may, in some instances, overcome the drawback that all reference pictures of the current picture are in the same side (in display order) as the current picture.

The example of FIG. 11 includes a current picture 160 including a current block 162, a first reference picture (Ref0) 164 including a first reference block 166, and a second reference picture (Ref1) 168 including a second reference block 170. As shown in FIG. 11, first reference picture (Ref0) 164 and second reference picture (Ref1) 168 are both located before the current picture in the temporal direction. Assuming that first reference block 166, second reference block 170, and current block 162 are along the same motion trajectory, the ratio between MV0 and MV1 shall be equal to the ratio between the temporal distance TD0 and TD1. In other words, given two references Ref0 and Ref1 with temporal distance TD0 and TD1 to the current picture, for any MV0 in Ref0, MV1 in Ref1 may be determined scaling MV0.

The video coder may select the final MV0 and MV1 pair as the pair that minimizes the matching cost between the block pair pointed by MV0 and MV1 (e.g., as described above with respect to FIG. 10). Theoretically, current block 162 may be regarded as an extrapolated block based on first reference block 166 and second reference block 170. It should be noted that the extended bilateral matching also works in normal bidirectional case in which the current picture is temporally between the two references. In this case, current block 162 may be regarded as an interpolated block based on first reference block 166 and second reference block 170. Moreover, the bilateral matching techniques described herein do not require "mirror relationship" between MV0 and MV1, even in bidirectional case. The assumption of bilateral matching is that the ratio between MV0 and MV1 is in proportion to the ratio between the temporal distance from Ref0 to the current picture and that from Ref1 to the current picture.

Clearly, for reference blocks other than first reference block 166 and second reference block 170, the video coder may derive a different MV pair. In one example, the video decoder may select reference pictures for performing bi-lateral matching according to an order in which the reference pictures appear in a reference picture list. For example, the video coder may select the first reference in reference list 0 as Ref0 and the first reference in reference list 1 as Ref1. The video coder may then search the MV pair (MV0, MV1). In another example, the video coder selects Ref0 based on an entry in an initial list (e.g., an initial motion vector candidate list). The video coder may then set Ref1 to a reference picture in the other reference picture list that is temporally closest to the current picture. Consequently, the video coder may search the MV pair (MV0, MV1) in Ref0 and Ref1.

Hence, according to aspects of this disclosure, the video coder may apply the extended bidirectional motion derivation techniques illustrated in FIG. 11 as a motion information derivation mode. For example, the video coder may use the bilateral matching to derive motion information of current block 162 by finding the best match between two blocks (e.g., such as first reference block 166 and second reference block 170) along the motion trajectory of the current block in two different reference pictures. Under the assumption of continuous motion trajectory, the motion vectors MV0 and MV1 pointing to the two reference blocks first reference block 166 and second reference block 170 shall be proportional to the temporal distances, i.e., TD0 and TD1, between the current picture and the two reference pictures. As a special case, when current picture 160 is temporally between two reference pictures (as shown in the example of FIG. 10) and the temporal distance from the current picture to the two reference pictures is the same, the bilateral matching becomes mirror based bidirectional MV.

FIG. 11 is a flowchart illustrating an example of decoding a prediction unit (PU) using DMVD. In Y.-J. Chiu, L. Xu, W. Zhang, H. Jiang, "Decoder-side Motion Estimation and Wiener filter for HEVC", Visual communications and Image Processing (VCIP), 2013, it was further proposed to combine the mirror based bidirectional MV derivation with merge mode in HEVC. In the proposed technique, a flag called pu_dmvd_flag is added for a PU of B slices to indicate if a DMVD mode is applied to the current PU. Because the DMVD mode does not explicitly transmit any MV information in the bitstream, the pu_dmvd_flag syntax element is integrated with the syntax of merge mode in HEVC (which uses an index for data representative of a motion vector rather than the motion vector itself).

In the example of FIG. 11, a video decoder (such as video decoder 30) may start decoding a PU (180). Video decoder 30 may determine whether the mode used to decode the PU is merge mode (182), e.g., based on syntax included in a bitstream that includes the PU. If merge mode is not used (the "no" branch of step 182), video decoder 30 may use a regular process for a non-merge PU to decode the PU (184) and finish the process (186).

If the merge mode is used (the "yes" branch of step 182), video decoder 30 may determine whether DMVD is used to determine motion information for the PU based on the value of the pu_dmvd_flag syntax element (188). If DMVD is not used (the "no" branch of step 188), video decoder 30 may use a regular merge mode to decode the PU (190) and finish the process (186). If DMVD is used (the "yes" branch of step 188), video decoder 30 may apply a DMVD process to determine the motion information for the PU (192) and finish the process (186).

In some instances, current video coding techniques may have certain limitations. For example, certain DMVD techniques may be regarded as a subset of FRUC technology. Although DMVD has been applied in video coding, other efficient FRUC techniques have not been implemented in video coding, e.g., in the video coding loop by a video encoder or video decoder. In addition, although different techniques of DMVD have been proposed, the interaction and overlap of such techniques are not exploited at the decoder. That is, only one DMVD mode has been used in other video coding systems. The manner in which to use a plurality of the DMVD techniques to further improve the coding efficiency has not been studied.

As another potential limitation, DMVD may apply only to relatively large blocks of video data and therefore may not be very efficient. Applying such methods for smaller blocks may lead to significant overhead due to the signaling cost. In some instances, the search range for traditional DMVD techniques may be relatively small, and only several points are searched, e.g., 16 points. In addition, as noted above, mirror based bidirectional MV derivation cannot be applied in low delay-B case, because two reference pictures with display order before and after a current picture need to be identified and this is not possible in low delay case.

Another potential limitation may be that, at the decoder, the matching cost of traditional DMVD techniques may only consider distortion. However, motion vector magnitude has not been considered in the matching cost, which may lead to local optimization or inaccurate result of the matching, e.g., due to the noise in the pixel domain. Moreover, the complexity of traditional DMVD techniques may be relatively high, in terms of both memory bandwidth and computational complexity, especially due to the fact that interpolation is needed for fractional-pel motion vectors during the search at the decoder.

The techniques of this disclosure may address one or more of the potential limitations described above. In some examples, the techniques for deriving motion information may be applied individually. Alternatively, any combination of the techniques described herein may be applied together. As described herein, reference index information may generally be regarded as a part of motion information. In some instances, motion vector information and reference index information may be referred to as a set of motion information.

Certain techniques of this disclosure include selecting a motion derivation mode from a plurality of potential motion derivation modes. For example, according to aspects of this disclosure, a video coder (e.g., video encoder 20 or video decoder 30) may use two or more motion derivation techniques to provide better prediction of the motion information at a video decoder to avoid signaling of the motion information in the bitstream. The two or more motion derivation techniques may include, but are not limited to, bilateral matching, template matching, and any other matching method. These techniques may generally be referred to as motion information derivation modes or FRUC modes. Hence, it should be understood that in some instances a technique referred to as a FRUC mode may instead by used to interpolate motion information for a current block (e.g., rather than interpolate a new block of video data).

In some examples, when multiple motion derivation methods are used, instead of having different optimization methods for different derivation methods, the process to find the best motion for two or more of the motion derivation methods may be aligned, in terms of the selection of the starting points for searching and how to search around the starting points. For example, the video coder may construct a motion vector candidate list, select an initial candidate from the list, and refine the candidate using the same searching and matching techniques. In this example, bidirectional motion derivation and template matching based motion derivation may be used in an adaptive manner at the decoder side.

According to aspects of this disclosure, additional signaling at the block-level is introduced to identify which motion derivation method is used for coding the current block. For example, the video coder may code one or more syntax elements to indicate whether motion information derivation is enabled. The video coder may also code one or more syntax element to indicate a particular motion information derivation mode from a plurality of potential modes. In other examples, the motion information derivation technique to be used may not be signaled, but derived at the video decoder, for example, based on a prediction mode or other information available before the current block is decoded. In still other examples, the video coder may perform multiple motion information derivation modes and determine a weighted average of the predictions from the two or more derivation techniques to code the current block.

In an example for purposes of illustration, a video decoder, such as video decoder 30, may first identify whether to apply a motion information interpolation mode (e.g., based on syntax in the bitstream). Video decoder 30 may then identify which motion information derivation mode is to be applied (e.g., based on syntax in the bitstream). In one example, when multiple motion derivation methods are supported simultaneously, e.g., both extended bilateral matching and template matching modes, an index value may be signaled in the bitstream to indicate which motion derivation method is actually in use for a current block. The index may have three values including off, extended bilateral matching, and template matching.

When using CABAC coding, two bins may be used to represent the index. The two bins may both use spatial neighbors as contexts or only one of them use spatial neighbors contexts. Alternatively, one or both bins may use other coded information, such as the CU depth, as contexts. The binarization of the index may be predefined, such as "0" for off, "10" for extended bilateral matching and "11" for template matching. Alternatively, the binarization of the index may be signaled in a slice header or derived from coded information such as slice type, temporal level, or QP information.

According to aspects of this disclosure, syntax that indicates a motion information derivation mode may be included with another coding mode. In one example, a motion information derivation mode may be considered a particular merge candidate, thus indicated by a merge index. In this case, the size of merge candidate list may be increased to accommodate the additional index. The merge candidate index for the motion information derivation mode may be pre-defined or signaled in the bitstream.

In some examples, extended bilateral matching and template matching are both supported with merge mode. In such examples, when merge_flag is equal to 1, a new motion information derivation flag is signaled to indicate whether motion information is derived for the current PU. The flag may use the same flag of its spatial neighbor, such as top and left blocks as CABAC coding contexts. When this flag is on, a second flag is signaled to indicate which motion information derivation mode (e.g., extended bilateral matching or template matching) is used to derive the motion information of the block. When motion derivation is on, even when the current mode is merge mode, no merge index is signaled. Alternatively or additionally, a particular motion information derivation (e.g., such as template matching) is not allowed if the PU is not the first PU of a CU in decoding order. In this case, only the flag needs to be signaled to indicate whether extended bilateral matching is used for the PU or not.

In another example, the motion information derivation mode may be combined with AMVP mode, e.g., at the PU level. In one example, additionally syntax elements (e.g., an additional flag) may be signaled to indicate the motion information derivation mode. When this mode is on, no AMVP index may be signaled in the bitstream. Otherwise, a regular AMVP index may be signaled in the bitstream. In another example, the motion information derivation mode may be regarded as a particular AMVP candidate, such as the first AMVP candidate, in an AMVP candidate list. In some instances, when combined with AMVP mode, a motion vector may not be derived at a sub-PU level.

According to other aspects, a video coder may initially conditionally code a CU level flag (e.g., for an inter-coded CU) to indicate whether all PUs within current CU use the motion information derivation mode. In one example, the PU level flag is not signaled. In another example, when the CU flag is equal to 0 (i.e., not all PUs are coded with the mode), the PU-level flag of the first PU is further signaled while the second PU does not include the PU-level flag.

In some examples, the motion information derivation mode may be disabled for specific slice types, temporal levels, block types, or block sizes. In one example, motion information derivation is not allowed when the current slice only includes reference pictures whose temporal positions are all before or after that of the current picture. In another example, motion information derivation is not allowed for non-2N×2N PUs. When disabling motion information derivation, no block-level signaling related to motion information derivation is needed.

According to aspects of this disclosure, enabling or disabling the motion information derivation techniques described herein may be controlled by high-level syntax to provide a better complexity versus coding efficiency trade-off and/or encoder/decoder flexibility. In one example, a flag may be signaled in an SPS, PPS, slice header or any other high level syntax header to indicate the usage of a motion information derivation mode. When this flag indicates this coding mode is not enabled, the CU/PU level flags may not be coded in the bitstream.

In some instances, high level syntax may additionally or alternatively be used to indicate other parameters of motion information derivation. For example, an index of the search algorithm that is to be used for searching for the PU-level motion vector may coded in a bitstream within an SPS, PPS, or slice header. In some instances, an index the search algorithm that is used for searching the sub-block level motion vector may be coded in the bitstream within an SPS, PPS, or slice header. In some examples, to keep low computational complexity at the decoder side, the maximal numbers of block/partition matching in the PU level, the maximal numbers of block/partition matching in the sub-PU level and/or the total matching number of in both the PU and sub-PU level may be constrained. In some instances, such maximum numbers may be predefined or signaled in the bitstream.

The techniques of this disclosure include a variety of techniques for deriving motion information. In some examples, the video coder may determine an initial list (starting candidate list) of entries containing motion vectors, and a best starting point is identified as an entry from the initial list. The entries containing motion vectors may be motion vectors from spatial neighbors, temporal neighbors and/or motion vectors derived by other means. Alternatively, the best starting point (or index of the best starting point) may be signaled to the decoder.

In some examples, the initial list may contain the motion vectors from the spatial and or temporal neighbors. Each entry of the initial list may be a uni-predictive set of motion information, including one motion vector and its reference index. In one example, the initial list may be generated in the same way as the motion prediction candidate list used in another coding mode, for example, the same as the merge candidate list. In this case, up to two motion vectors of each merge candidate can be used to generate up to two entries in the initial list. In some instances, the entries in the initial list may be generated from a subset of motion prediction candidates in a list used in another coding mode, for example, a subset of the merge candidate list.

In another example, additional motion vectors may be added into the initial list, in addition to those in the motion prediction candidates list used in another coding mode, for example, in addition to those in merge candidate list. Alternatively or additionally, the motion vectors of the spatial neighbors of the current block, such as a top block, a left block, a top right block, or another block may be added to the initial list. In some instances, zero motion vectors with different reference picture indexes may also be added to the list.

Alternatively or additionally, the motion vectors of the temporally collocated blocks of the current block (e.g., a TMVP for the current block), and/or motion vectors of the temporally bottom-right collocated blocks of the current block in reference pictures may be added to the initial list. Before adding a particular candidate motion vector to the list, the motion vectors may or may not be scaled based on temporal distance.

According to some aspects, a motion vector may be interpolated and/or extrapolated from a reference picture and may be added in the initial list. For example, before coding an inter picture, an interpolated and/or extrapolated motion field of the picture may be generated based on its reference pictures with a uni-lateral ME-like technique. The interpolated and/or extrapolated motion field of a block may be used for MV prediction or used as additional starting candidates in an MV search of a motion information derivation mode. Note that the interpolated and/or extrapolated motion field is saved in the unit of 4×4 or 8×8 or any other predefined/signaled block level, and a PU may contain multiple such blocks so that multiple interpolated and/or extrapolated MVs may be used.

In one example, the motion field of each reference pictures in both reference lists is traversed N×N block by N×N block, where N may be predefined such as 4, 8, or 16, or signaled. For each block, if the motion associated to the block passing through a N×N block in the current picture and the block has not been assigned any interpolated motion, the motion of the reference block is scaled to the current picture in the same way as that of MV scaling in TMVP and the scaled motion is assigned to the block in the current frame. If no scaled MV is assigned to an N×N block, the block's motion is marked as unavailable in the interpolated motion field. In another example, an N×N block in the current picture may be assigned multiple motion vectors in the interpolated motion field.

In some instances, a video coder may prune one or more candidates from a candidate list. Pruning may be applied to remove identical entries from an initial list before the best starting point selection process, e.g. before calculating the matching cost for each candidate of the list.

In some instances, the first picture in each reference list may be used as the reference picture, and motion vector candidates are scaled accordingly if necessary. In such a case, the reference index of each entry of the initial list may be modified after the motion vector is scaled based on e.g., POC distance, similar as in TMVP. In some instances, the reference index of each entry can be fixed to one or two pictures and the associated motion vectors can be scaled towards such pictures.

In one example, for bilateral matching, a motion vector pair, which is a full set of motion information containing both motion vectors and their associated reference indices to reference list 0 and list 1, respectively, may be obtained based on each entry of an initial candidate list. A video coder may then perform bilateral matching for all the MV pairs generated from all entries in the initial list, and select the candidate that leads to the minimal matching cost.

To generate the MV pair, the video coder may select an entry of the initial list as the first motion vector and generate the second motion vector. For example, assume that one entry contains the current first motion vector $MV_A$ and it is associated a reference index (with POC value $POC_A$) to a first reference picture in reference picture list A (with A being equal to 0 or 1). Assuming the POC value of the current picture is $POC_C$, the video coder may be configured to find a second reference picture from the reference picture list B (with B being equal to 1−A) such that its POC value $POC_B$ is equal to ($2 \times POC_C - POC_A$). If no reference picture in the reference picture list B has POC value equal to ($2 \times POC_C - POC_0$), the video coder may select the second reference picture by checking all reference pictures in the list B such that $POC_B$ is not equal to $POC_A$ and the absolute value of $POC_C - POC_B$ is the minimal. In summary, the video coder may select a picture located on the other side of the current picture (in display order) having the same POC distance. If it is not available, the video coder may select a picture on the other side having the smallest distance to the current picture. If all reference pictures are on the same temporal side as the first reference with $POC_A$ when compared to the current picture, the video coder may select the reference which is temporally closest to the current picture and has a POC other than $POC_A$. Under foregoing assumptions, the video coder may scale the first motion vector $MV_A$ to generate the second motion vector associated with the second reference picture, e.g., based on POC difference as in TMVP. Alternatively, any techniques based on the bilateral MV assumption can be used to generate the second reference picture and its motion vector.

According to some aspects, two starting motion vectors may be selected from the initial list. Each of these two motion vectors are selected (in terms of minimal matching cost) from the entries in two subsets of the initial list. Each sub subset contains motion vectors associated with reference index only to the reference picture list 0 or only to the reference picture list 1.

According to aspects of this disclosure, a video coder may be configured to select a candidate from a candidate based on a matching cost associated with the motion vector. In addition, after selecting a candidate from a candidate list, the video coder may refine the candidate motion vector to derive motion information for a block. For example, the candidate motion vector may be used to indicate a starting point of a reference picture, which may then be searched to find a best match based on a matching cost.

According to aspects of this disclosure, a variety of matching costs may be used, e.g., when determining a best match for an initial motion vector candidate and/or when refining the initial motion vector candidate. In one example, when searching the motion of a block, an MV cost may be included in the matching cost to avoid negative impact by noise. For example, the refinement portion of the motion vector (e.g., difference between the current MV and the search center), denoted as MVR may be used to calculate the cost. In this example, the cost may be w*(|MVR[0]|+|MVR[1]|), where w is a weighting factor that may be signaled or predefined and MVR[0] and MVR[1] are the two components of MVR. Alternatively, the refined motion vector MV can be used to calculate the cost, e.g., as w*(|MV[0]|+|MV[1]|).

In some examples, when the block is relatively small, e.g., 4×4 or smaller, a larger block covering the block (e.g. the block with extended boundaries) may be used in matching cost calculation in order to suppress noise. For example, when searching best match for a 4×4 block, the matching cost may be calculated based on 8×8 block with a center block being the block.

In some examples, the matching cost may be any kind of distance/cost, such as sum of absolute differences (SAD), sum of squared errors of prediction (SSE), or sum of absolute transformed differences (SATD). To reduce computational complexity the SAD, the SSE, or other cost may be calculated with reduced resolution in horizontal, vertical or both directions. For example, for an 8×8 block, SAD may be calculated based on odd rows only. In another example, the matching cost may be calculated based on a selected subset of a block, for example, only a center region of a may be used.

According to aspects of this disclosure, the refinement process for the best match (e.g., the selected candidate based on the matching cost) may be performed within a predefined or signaled search window instead of always using a small window, e.g., within a 2×2 window (here the unit is pixel and fractional motion vectors can be searched out within a window) to achieve a more efficient yet low complexity search. In this example, the range of a search window (e.g., with a size of 16×16) may be predefined or signaled in the bitstream.

The search algorithm for searching may be predefined, such as a full search, a three-step search, a diamond search, a block-based gradient descent search algorithm (BBGDS) as described, for example, in Lurng-Kuo Liu, Ephraim Feig, "A block-based gradient descent search algorithm for block motion estimation in video coding," IEEE Trans. Circuits Syst. Video Technol., vol. 6, pp, 419-422, August 1996, or a unrestricted center-biased diamond search algorithm (UCBDS) as described, for example, in Jo Yew Tham, Surendra Ranganath, Maitreya Ranganath, and Ashraf Ali Kassim, "A novel unrestricted center-biased diamond search algorithm for block motion estimation," IEEE Trans. Circuits Syst. Video Technol., vol. 8, pp. 369-377, August 1998.

In some instances, different search techniques may be used in different instances based on signaling or predefined criteria. For example, for searching a whole PU, a diamond search may be used. For searching a sub-PU, a small diamond search may be used. Additionally, or alternatively, early stop may be applied during searching, e.g., when matching cost is below a predefined or adaptive thresholds. When using template matching, a constraint may further be applied that the two motion vectors of the two reference lists after refinement shall not point to the same block in the same reference picture.

As noted above, this disclosure describes certain optimization techniques for existing DMVD processes. For example, as described above with respect to the example of FIG. 10, the techniques include extending bilateral matching from bidirectional prediction to uni-directional prediction. Bilateral matching may also be applied when the temporal positions of two reference pictures are both before or after the temporal position of the current slice (i.e., the POC values are smaller or larger than that of current picture). Such techniques may be collectively referred to herein as extended bilateral matching.

Other aspects of this disclosure relate to interpolation techniques. For example, according to aspects of this disclosure, interpolation techniques may be simplified to reduce complexity. As noted above with respect to FIG. 2, motion search is typically performed using sub-pixel precision. Accordingly, interpolation is needed for non-integer pixel positions. To reduce computational complexity, according to aspects of this disclosure, a video coder may use an interpolation filter with shorter taps compared to normal motion compensation interpolation. In one example, the video coder may use a bilinear interpolation filter during motion search, e.g., when applying initial candidate motion vectors or refining such motion vectors. In another example, the video coder may be configured to initially perform motion searching using integer-pixel positions, followed by performing motion searching at fractional-pixel positions with the best match of integer-pixel position as the starting point.

Other techniques of this disclosure relate to deriving motion information for sub-blocks. For example, according to aspects of this disclosure, a video coder may split a block/PU into (non-overlapped) sub-PUs/sub-blocks based on any motion derivation technique. When a PU is split into multiple, smaller sized sub-PUs, the video coder may derive a unique set of motion information for each sub-PU.

In an example for purposes of illustration, a 32×32 PU may be split into 16 8×8 sub-PUs. In this example, the video coder may determine different reference indices and/or motion vectors for each of the 8×8 sub-PUs. In other examples, sub-PUs may have other sizes, e.g., 4×4, 2×2 or 1×1.

In some instances, the size of the sub-block/sub-PU may be pre-defined and fixed regardless the size of block/PU. In other examples, a split depth D for PUs may be defined that controls the number of times a PU may be split according to a quadtree structure. In some examples, a minimal sub-PU/sub-block size may be predefined or signaled to indicate the target size of the sub-block/sub-PU to which the current block/PU shall be split into. The target size may be the larger one between the minimal sub-PU/sub-block size and the size obtained by splitting the current block D times according to a quadtree structure.

According to aspects of this disclosure, a video coder may leverage derived motion information for a PU when deriving motion information for sub-PUs of the PU. For example, the video coder may, for each sub-PU, search for respective unique motion information by setting the motion information of the whole block as the search center (initial search point). The video coder may then refine the motion for each sub-PU. Alternatively, the search center of each sub-PU may be derived from a list of starting point candidates.

In another example, a motion vector candidate list may be generated for the sub-PU using any of the techniques described herein. The video coder may then check each candidate in the list after checking the search center (e.g., the initial search point derived from the PU). According to aspects of this disclosure, sub-PUs may be refined using any of the techniques described herein as being applicable to regular blocks. In other examples, refinement may be always or conditionally skipped for sub-PUs after checking the motion vector candidate list for a best match in the manner described above. One possible condition may be whether the best match remains the candidate indicated by the motion information of the PU (e.g., the initial search point) after checking the candidate list. If true, the video coder may skip the refinement. Otherwise, the video coder may perform the refinement.

In some examples, motion vector filtering may be performed for sub-PU to correct an isolated wrong motion vector. For example, a video coder may use a median filter with the motion vector of current sub-PU and motion vectors of up to four neighboring sub-PUs. According to aspects of this disclosure, when applying transforms, the video coder may regard the whole PU as a whole block so that a transform may cross sub-PU boundaries. In other examples, the video coder may apply transforms to each sub-PU such that the transform size is no larger than sub-PU size. In some instances, when template matching is used, a whole PU may also be further split into smaller sub-PUs. For sub-PUs whose spatial neighbors are all in the current PU (their templates are not available), the video coder may set their motion vectors to the motion vectors derived for the whole PU.

In some examples, a video coder may code separate syntax elements that indicate whether a particular block is split. In another example, all 2N×2N blocks with extended bilateral matching mode are further split into small partitions and no additional flag is signaled. The size of the sub-block may be predefined or signaled. Alternatively, the size of sub-block may be based on the size of the current block. For example, the size of sub-block may be derived as the larger number of two values. The first value is a predefined or signaled minimal sub-block size (e.g., such as 4×4 or 8×8). The second value is a relative size to the current block, such as $(S>>d)\times(S>>d)$ where S×S is the current block size, while d is a predefined or signaled value to indicate the quad-tree depth with which the current block is split into sub-blocks. In the examples above, it should be understood that the term PU is used interchangeably with the term block and the term sub-PU is used interchangeably with the term sub-block.

As noted above, the techniques descried herein may be used independently or in combination. As an example, a motion information derivation process associated with a motion information derivation mode (e.g., an extended bilateral matching mode, a template matching mode, or any other mode) may include three steps, though the third step may be conditionally performed based on slice type, temporal level, block type, block size, or syntax defined in the bitstream.

In a first step, a video coder may formulate an initial candidate list of uni-predictive sets of motion information for a current block. The video coder may select the candidate having the best starting point from the list, e.g., based on a matching cost. In a second step, the video coder may refine the selected candidate to derive the motion information for the current block. The refinement may also be based on a matching cost, as described herein. The video coder may then optionally further split the current block into sub-blocks as described herein, and refine each motion vector for each sub-block. Finally, the video coder may apply motion compensation for the current block using the derived motion information. If splitting has been performed, the video coder may apply motion compensation on a sub-block by sub-block basis.

In one example, following pseudo code may be used to reconstruct a block using a motion information derivation mode, where motion information is derived by either bilateral matching or template matching. When bilateral matching is used, the block is further split into sub-blocks (note that MV here includes reference information):

---

Reconstruct block B (with size W×H) in FRUC
---
Construct initial list
  if B is bilateral matching
  {
    Find the best match (e.g., bilateral matching) in the initial list
  as the starting point with the measurement of bilateral matching
    Refine the MV based on the starting point with bilateral matching
  to get the motion vector $MV_B$ for the block B
    for each sub-block in block B

| Reconstruct block B (with size WxH) in FRUC |
|---|
| ```
{
  taking MV_B as the starting point, refine MV for each sub-block
    do motion compensation for the sub-block with the derived MV info
  }
}
else // template matching
{
  Find the best match (e.g., template matching) in the initial list as
the starting point with the measurement of template matching
  Refine the MV based on the starting point with template matching
}
``` |

Hence, according to aspects of this disclosure, video encoder 20 or video decoder 30 may determine a motion information interpolation mode to determine motion information for a current block (a block currently being encoded or decoded). Using the motion information interpolation mode (e.g., bilateral matching, template matching, or another technique), video encoder 20 or video decoder 30 may determine the best motion vector candidate in a list of motion vector candidates, e.g., the motion vector that identifies a reference block that closely matches the current block. Video encoder 20 or video decoder 30 may use the motion vector candidate to identify a search window in a reference picture.

Video encoder 20 or video decoder 30 may refine the motion vector candidate based on a reference block in the search window that closely matches the current block. That is, video encoder 20 or video decoder 30 may determine a new, interpolated motion vector for the current block based on the motion between the reference block in the search window that closely matches the current block and the current block. Video encoder 20 or video decoder 30 may then perform motion compensation for the current block using the interpolated motion vector.

In some instances, video encoder 20 or video decoder 30 may split the current block into more than one sub-block for purposes of prediction. Moreover, in other examples, video encoder 20 or video decoder 30 may perform more, fewer, or a different arrangement of techniques to interpolate motion information.

Hence, certain techniques of this disclosure may be generalized as a block-level coding tool that leverages certain concepts from FRUC, given the assumption that a current block of a current picture may be considered to be predicted by reference pictures in a way similar to a current picture may be considered to be interpolated by reference pictures in FRUC. In one example, only the motion based processes are used for the block-level coding tool. In another example, only the pixel based processes are used for the block-level coding tool. In another example, either the motion based processes or the pixel based processes are used for a given block. In another example, both the pixel based processes and the motion based processes are used for the block-level coding tool. In another example, other syntax may be reused or predicted from the other temporal frames and may be used for the coding tool, such as information of the coding tree, SAO, ALF, RQT information.

Figure 12:
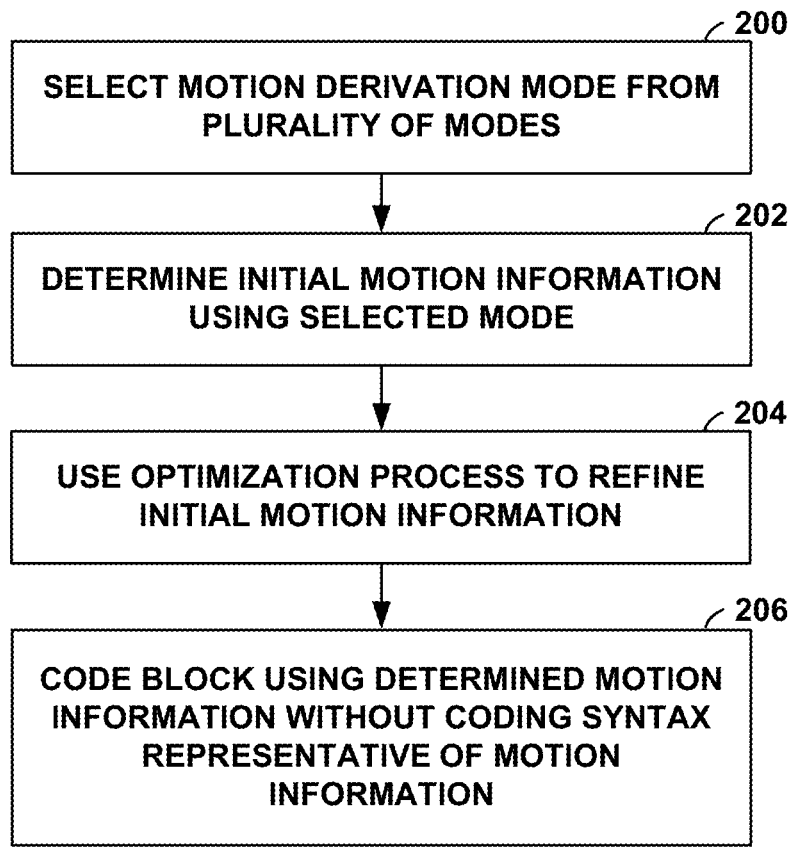
FIG. 12 is a flowchart illustrating an example process for determining a motion information derivation mode for coding a block of video data.

FIG. 12 is a flowchart illustrating an example process for determining a motion information derivation mode for coding a block of video data. The example process of FIG. 12 is described with respect to a video coder, which may be configured as video encoder 20, video decoder 30, or another processor.

In the example of FIG. 12, the video coder may select a motion derivation mode from a plurality of motion derivation modes (200). In general, each of the motion derivation modes may include performing a motion search for a first set of reference data that corresponds to a second set of reference data outside of the current block. For example, with respect to template matching, the video coder may perform a motion search to identify a template in a current picture (e.g., a first set of reference data) that corresponds to the template in a reference picture (e.g., a second set of reference data). In another example, with respect to bilateral motioning, the video coder may perform a motion search to identify a reference block in a first reference picture (e.g., a first set of reference data) that corresponds to a second reference block in a second reference picture (e.g., a second set of reference data). Example motion derivation modes may include, a unilateral motion estimation mode, a bilateral matching mode, a template matching mode, or a mirror based mode.

According to some aspects, the video coder may select the motion information derivation mode in accordance with one or more syntax elements included in a bitstream. For example, a video decoder may parse and decode the one or more syntax elements from the bitstream and determine the motion information derivation mode based on the syntax. A video encoder may test the plurality of motion information derivation modes, select the mode having the best RD cost, and encode the one or more syntax elements in the bitstream that indicate the selected mode.

The video coder may determine motion information for the block using the selected motion derivation mode, which may include determining an initial motion information using the selected mode (202) and using an optimization process to refine the initial motion information (204). For example, the video coder may construct a motion vector candidate list with candidates for determining initial motion information. The initial motion information may provide a starting point for refining the motion information, as described herein.

The video coder may then code the block using the determined motion information and without coding syntax representative of the motion information (206). For example, in instances in which the video coder comprises a video decoder, the video decoder may determine a reference block in a reference picture based on the determined motion information, decode residual data from an encoded bitstream, and combine the decoded residual and the determined reference block to reconstruct the current block. In instances in which the video coder comprises a video encoder, the video encoder may encode residual data for the current block in an encoded bitstream without coding reference indices or motion vectors for the residual data.

Figure 13:
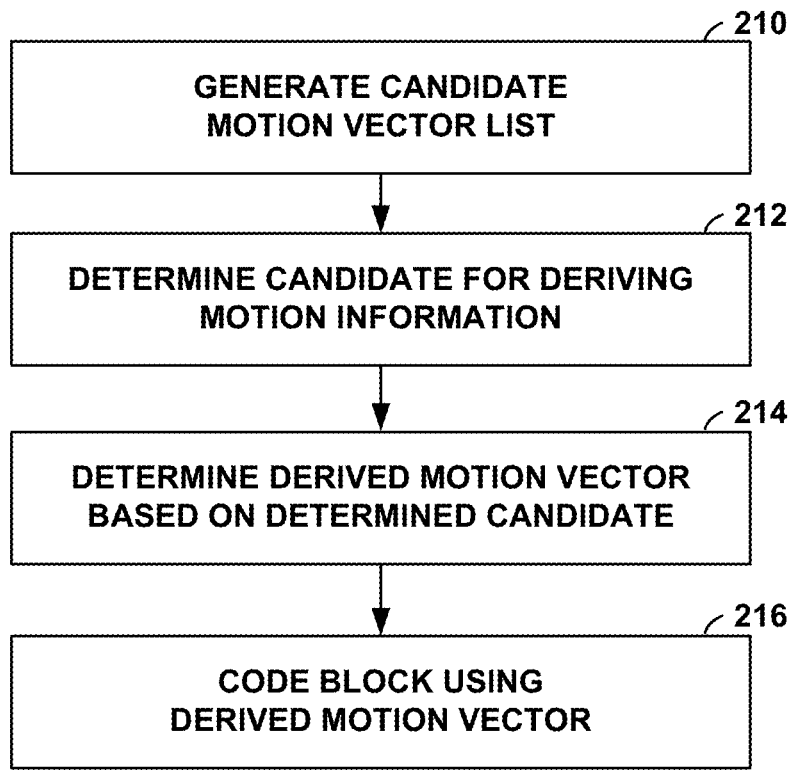
FIG. 13 is a flowchart illustrating an example process for deriving a motion vector for coding a block of video data.

FIG. 13 is a flowchart illustrating an example process for deriving a motion vector for coding a block of video data. The example process of FIG. 13 is described with respect to a video coder, which may be configured as video encoder 20, video decoder 30, or another processor.

The video coder may generate a candidate motion vector list (210). The candidate motion vector list may include one or more motion vector candidates that may be used for deriving motion information for the current block. In some examples, the motion vector candidates may be determined from spatially neighboring blocks, temporal blocks, or from other locations.

The video coder may determine a candidate from the list for deriving motion information (212). In some examples, the video coder may perform one or more cost calculations to determine the candidate using a particular motion derivation mode. For example, the video coder may determine a matching cost for a first set of reference data and a second set of reference data, which may include a cost associated with the respective motion vectors, as described herein.

The video coder may then determine the derived motion vector based on the determined candidate (214). For example, the video coder may refine the determined candidate to determine the derived motion vector using the motion derivation mode. The video coder may then code the block using the derived motion vector (216). For example, in instances in which the video coder comprises a video decoder, the video decoder may determine a reference block in a reference picture based on the derived motion vector, decode residual data from an encoded bitstream, and combine the decoded residual and the determined reference block to reconstruct the current block. In instances in which the video coder comprises a video encoder, the video encoder may encode residual data for the current block in an encoded bitstream without coding the derived motion vector.

Figure 14:
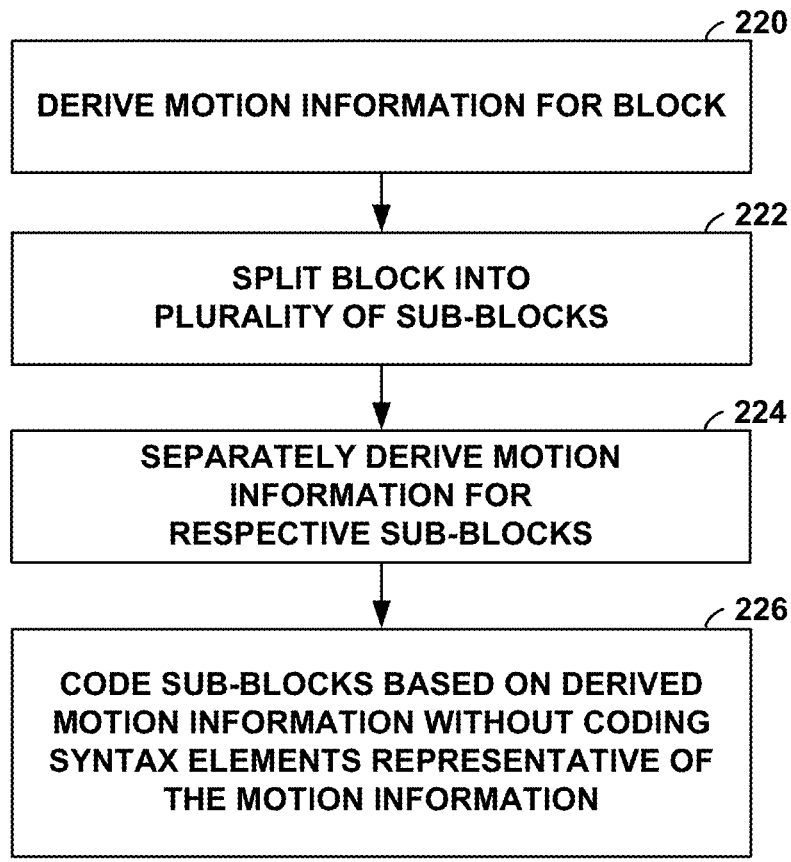
FIG. 14 is a flowchart illustrating an example process for deriving motion information for sub-blocks of a block of video data.

FIG. 14 is a flowchart illustrating an example process for deriving motion information for sub-blocks of a block of video data. The example process of FIG. 14 is described with respect to a video coder, which may be configured as video encoder 20, video decoder 30, or another processor.

The video coder may derive motion information for a current block (220). In some examples, the video coder may use any combination of motion information derivation techniques described herein to derive the motion information. For example, the video coder may use any of the techniques described herein to perform a motion search for a first set of reference data that corresponds to a second set of reference data outside of the current block (e.g., template matching, bilateral matching or the like).

According to aspects of this disclosure, the video coder may also split the block into a plurality of sub-blocks (222). The video coder may separately derive motion information for respective sub-blocks comprising performing a motion search for a first set of reference data that corresponds to a second set of reference data outside of each respective sub-block (224). Again, the video coder may use any techniques described herein to derive the motion information such as, for example, template matching, bilateral matching, or the like. For example, the video coder may use the derived motion vector as a starting point for deriving motion information for each of the sub-blocks, and may further refine the derived motion information using any combination of the motion information derivation techniques described herein.

The video coder may then code each of the sub-blocks based on derived motion information without coding syntax elements representative of the motion information (226). For example, in instances in which the video coder comprises a video decoder, the video decoder may determine a reference block in a reference picture for each sub-block based on the determined motion information, decode residual data for each sub-block from an encoded bitstream, and combine the decoded residual and the determined reference block to reconstruct each sub-block. In instances in which the video coder comprises a video encoder, the video encoder may encode residual data for each sub-block in an encoded bitstream without coding reference indices or motion vectors for the residual data.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding video data, the method comprising:
    deriving motion information for a current block of video data, wherein the motion information indicates motion of the current block relative to reference video data;
    splitting the current block of video data into a plurality of sub-blocks;
    deriving, separately for each respective sub-block of the plurality of sub-blocks and without decoding syntax elements representative of sub-block motion information, the sub-block motion information using the motion information for the current block, the deriving comprising refining the sub-block motion information by performing a motion search for a respective first set of reference video data based on a respective second set of reference video data, wherein the first set of reference video data is in a different picture than the second set of reference video data, wherein the motion search uses the motion information for the current block as a starting point; and
    decoding the plurality of sub-blocks based on the derived sub-block motion information.

2. The method of claim 1, wherein the sub-block motion information for each of the sub-blocks comprises at least one motion vector and at least one reference index of a reference picture in a reference picture list.

3. The method of claim 1, wherein the size of the sub-blocks comprises at least one of 1×1, 2×2, 4×4, 8×8, 16×16, or 32×32.

4. The method of claim 1, wherein the current block comprises a prediction unit (PU) and the sub-blocks comprise sub-PUs.

5. The method of claim 1, wherein splitting the current block comprises splitting the current block to form sub-blocks of a fixed size regardless of the size of the current block.

6. The method of claim 1, wherein splitting the current block comprises splitting the current block based on a minimum sub-block size.

7. The method of claim 6, further comprising determining the minimum sub-block size based on a split depth parameter D that indicates a maximum split depth for the block.

8. The method of claim 1, wherein deriving the sub-block motion information for the respective sub-blocks comprises:
    determining a search window in a reference picture based on the derived motion information for the current block;
    searching for a respective best match between the respective first set of reference video data and the respective second set of reference video data for the respective sub-blocks within the search window; and
    deriving the sub-block motion information for the respective sub-blocks based on the respective best match.

9. The method of claim 8, further comprising:
    generating a candidate list comprising a plurality of candidate motion vectors, the candidate list including the derived motion information for the current block as a candidate of the plurality of candidate motion vectors; and
    determining respective candidate motion vectors from the candidate list for respective sub-blocks,
    wherein the searching for the respective best match comprises searching based on the respective candidate motion vectors.

10. The method of claim 1, further comprising applying a transform to the current block such that the transform is applied to all of the sub-blocks.

11. The method of claim 1, wherein splitting the current block comprises splitting the current block based on one or more syntax elements obtained from an encoded bitstream, and wherein decoding the plurality of sub-blocks comprises:
    determining a reference block in a reference picture for the respective sub-blocks based on the derived sub-block motion information;
    decoding residual data for respective sub-blocks from an encoded bitstream; and
    combining the decoded residual for the respective sub-blocks and the reference block for the respective sub-blocks to reconstruct the respective sub-blocks.

12. The method of claim 1, wherein deriving, separately for each respective sub-block of the plurality of sub-blocks, sub-block motion information using the motion information for the current block comprises:
    deriving, separately for each respective sub-block of the plurality of sub-blocks, sub-block motion information using the motion information for the current block using bilateral mapping.

13. A device for decoding video data, the device comprising:
    a memory configured to store a current block of video data; and
    one or more processors configured to:
        derive motion information for the current block of video data, wherein the motion information indicates motion of the current block relative to reference video data;
        split the current block of video data into a plurality of sub-blocks; and
        derive, separately for each respective sub-block of the plurality of sub-blocks and without decoding syntax elements representative of sub-block motion information, the sub-block motion information using the motion information for the current block, wherein to derive the motion information the one or more processors are configured to refine the sub-block motion information by performing a motion search for a respective first set of reference video data based on a respective second set of reference video data, wherein the first set of reference video data is in a different picture than the second set of reference video data, wherein the motion search uses the motion information for the current block as a starting point; and
        decode the plurality of sub-blocks based on the derived sub-block motion information.

14. The device of claim 13, wherein the sub-block motion information for each of the sub-blocks comprises at least one motion vector and at least one reference index of a reference picture in a reference picture list.

15. The device of claim 13, wherein the size of the sub-blocks comprises at least one of 1×1, 2×2, 4×4, 8×8, 16×16, or 32×32.

16. The device of claim 13, wherein the current block comprises a prediction unit (PU) and the sub-blocks comprise sub-PUs.

17. The device of claim 13, wherein to split the current block, the one or more processors are configured to split the current block to form sub-blocks of a fixed size regardless of the size of the current block.

18. The device of claim 13, wherein to split the current block, the one or more processors are configured to split the current block based on a minimum sub-block size.

19. The device of claim 18, wherein the one or more processors are further configured to determine the minimum sub-block size based on a split depth parameter D that indicates a maximum split depth for the block.

20. The device of claim 13, wherein to derive the sub-block motion information for the respective sub-blocks, the one or more processors are configured to:
determine a search window in a reference picture based on the derived motion information for the current block;
search for a respective best match between the respective first set of reference video data and the respective second set of reference video data for the respective sub-blocks within the search window; and
derive the sub-block motion information for the respective sub-blocks based on the respective best match.

21. The device of claim 20, wherein the one or more processors are further configured to:
generate a candidate list comprising a plurality of candidate motion vectors, the candidate list including the derived motion information for the current block as a candidate of the plurality of candidate motion vectors; and
determine respective candidate motion vectors from the candidate list for respective sub-blocks,
wherein to search for the respective best match, the one or more processors are configured to search based on the respective candidate motion vectors.

22. The device of claim 13, wherein the one or more processors are configured to apply a transform to the current block such that the transform is applied to all of the sub-blocks.

23. The device of claim 13, wherein to decode the plurality of sub-blocks, the one or more processors are configured to decode the plurality of sub-blocks, wherein to split the current block, the one or more processors are configured to split the current block based on one or more syntax elements obtained from an encoded bitstream, and wherein to decode the plurality of sub-blocks, the one or more processors are configured to:
determine a reference block in a reference picture for the respective sub-blocks based on the derived sub-block motion information;
decode residual data for respective sub-blocks from an encoded bitstream; and
combine the decoded residual for the respective sub-blocks and the reference block for the respective sub-blocks to reconstruct the respective sub-blocks.

24. The device of claim 23, further comprising a display configured to display the decoded block.

25. The device of claim 13, wherein the device comprises at least one of:
an integrated circuit;
a microprocessor; or
a wireless communication device.

26. The device of claim 13, wherein to derive, separately for each respective sub-block of the plurality of sub-blocks, sub-block motion information using the motion information for the current block, the one or more processors are further configured to:
derive, separately for each respective sub-block of the plurality of sub-blocks, sub-block motion information using the motion information for the current block using bilateral mapping.

27. A non-transitory computer-readable medium having instructions stored thereon that, when executed, cause one or more processors configured to decode video data to:
derive motion information for a current block of video data, wherein the motion information indicates motion of the current block relative to reference video data;
split the current block of video data into a plurality of sub-blocks; and
derive, separately for each respective sub-block of the plurality of sub-blocks and without decoding syntax elements representative of sub-block motion information, the sub-block motion information using the motion information for the current block, wherein to derive the motion information the instructions cause the one or more processors to refine the sub-block motion information by performing a motion search for a respective first set of reference video data based on a respective second set of reference video data, wherein the first set of reference video data is in a different picture than the second set of reference video data, wherein the motion search uses the motion information for the current block as a starting point; and
decode the plurality of sub-blocks based on the derived sub-block motion information.

28. The non-transitory computer-readable medium of claim 27, wherein to derive, separately for each respective sub-block of the plurality of sub-blocks, sub-block motion information using the motion information for the current block, the instructions further cause the one or more processors to:
derive, separately for each respective sub-block of the plurality of sub-blocks, sub-block motion information using the motion information for the current block using bilateral mapping.

* * * * *